US010197699B2

(12) United States Patent
Donderici et al.

(10) Patent No.: US 10,197,699 B2
(45) Date of Patent: Feb. 5, 2019

(54) LOGGING WHILE DRILLING (LWD) STEERING VISUALIZATION TOOL METHODS AND SYSTEMS

(71) Applicant: HALLIBURTON ENERGY SERVICES, INC., Houston, TX (US)

(72) Inventors: Burkay Donderici, Houston, TX (US); Hsu-Hsiang Wu, Sugar Land, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 114 days.

(21) Appl. No.: 14/892,558

(22) PCT Filed: Jun. 13, 2013

(86) PCT No.: PCT/US2013/045650
§ 371 (c)(1),
(2) Date: Nov. 19, 2015

(87) PCT Pub. No.: WO2014/200491
PCT Pub. Date: Dec. 18, 2014

(65) Prior Publication Data
US 2016/0195633 A1 Jul. 7, 2016

(51) Int. Cl.
G01V 3/38 (2006.01)
G01S 13/89 (2006.01)

(52) U.S. Cl.
CPC ............... G01V 3/38 (2013.01); G01S 13/89 (2013.01)

(58) Field of Classification Search
CPC .. G01V 3/38; G01V 2210/00; G01V 2210/60; G01V 2210/66; G01V 2210/70; G01V 2210/72; G01V 2210/74; G01S 13/89
See application file for complete search history.

(56) References Cited

U.S. PATENT DOCUMENTS

| 6,088,294 | A | 7/2000 | Leggett, III et al. |
| 6,885,943 | B2 | 4/2005 | Bittar et al. |
| 7,366,616 | B2 | 4/2008 | Bennett et al. |
| 7,746,076 | B2 | 6/2010 | Ostermeier et al. |
| 8,049,508 | B2 | 11/2011 | Gorek |

(Continued)

FOREIGN PATENT DOCUMENTS

| CN | 101932955 A | 12/2010 |
| CN | 102725479 A | 10/2012 |

(Continued)

OTHER PUBLICATIONS

Amer et al., Structural Steering—A Path to Productivity, May 22, 2013, Schlumberger Oilfield Review, Spring 2013: 25, No. 1, pp. 14-31.*

(Continued)

Primary Examiner — Toan Le
(74) Attorney, Agent, or Firm — Gilliam IP PLLC

(57) ABSTRACT

A disclosed method includes acquiring ahead of bit or around bit data related to a formation from measurements by a tool. The method also includes generating a map view of the formation using the acquired data. Various map views and map view features are disclosed. An operator may select one or more of the map views and/or map view features to make steering decisions for a logging while drilling system.

65 Claims, 19 Drawing Sheets

(56) References Cited

U.S. PATENT DOCUMENTS

| 8,433,518 | B2 | 4/2013 | Omeragic et al. |
|---|---|---|---|
| 2004/0059513 | A1 | 3/2004 | Bittar et al. |
| 2006/0074561 | A1 | 4/2006 | Xia et al. |
| 2008/0179094 | A1 | 7/2008 | Repin et al. |
| 2011/0133740 | A1 | 6/2011 | Davies et al. |
| 2011/0175899 | A1 | 7/2011 | Bittar et al. |
| 2012/0191432 | A1 | 7/2012 | Khataniar et al. |
| 2012/0298420 | A1 | 11/2012 | Seydoux et al. |
| 2013/0027044 | A1 | 1/2013 | Snyder et al. |
| 2013/0141102 | A1 | 6/2013 | Donderici et al. |

FOREIGN PATENT DOCUMENTS

| RU | 61441 U1 | 10/2006 |
|---|---|---|
| RU | 2497152 C2 | 7/2011 |
| WO | 2009/029517 | 3/2009 |
| WO | 2011049828 A2 | 4/2011 |
| WO | 2011/149742 | 12/2011 |
| WO | 2013/074112 | 5/2013 |
| WO | 2014/123509 | 8/2014 |
| WO | 2014/200491 | 12/2014 |

OTHER PUBLICATIONS

Abstract of Amer et al., May 22, 2013, 2 pp.*

PCT International Search Report and Written Opinion, dated Jan. 8, 2014 Appl No. PCT/US2013/045650, "Logging while Drilling (LWD) Steering Visualization Tool Methods and Systems," filed Jun. 13, 2013, 18 pgs.

EP Partial Search Report, dated Mar. 3, 2017, Appl No. 13886830.2, "Logging While Drilling (LWD) Steering Visualization Tool Methods and Systems," Filed Jun. 13, 2013, 7 pgs.

CN Office Action, dated Dec. 5, 2016, Appl No. 201380076606.7, "Logging While Drilling (LWD) Steering Visualization Tool Methods and Systems," Filed Jun. 13, 2013, 37 pgs.

CA Examination Report, dated Nov. 7, 2016, Appl No. 2,911,648, "Logging While Drilling (LWD) Steering Visualization Tool Methods and Systems," Filed Jun. 13, 2013, 3 pgs.

AU Examination Report No. 2, dated May 10, 2017, Appl No. 2013392071, "Logging While Drilling (LWD) Steering Visualization Tool Methods and Systems," Filed Jun. 13, 2013, 4 pgs.

Halliburton, Wireline and Perforating Services, URL: http://www.halliburton.com/public/lp/contents/Brochures/web/WPS-Capabilities.pdf, Aug. 22, 2017, 15 pages.

DE Application Serial No. 112013007153.3, DE Associate Report, dated Jul. 24, 2017, 10 pages.

CA Application Serial No. 2,911,648, Second Examiner's Letter, dated Oct. 30, 2017, 5 pages.

CN Application Serial No. 20130076606.7, Second Office Action, dated Aug. 22, 2017, 20 pages.

Russian Application Serial No. 2015148612; Russian Notice of Decision to Grant; dated May 8, 2018, 11 pages.

Chinese Application Serial No. 201380076606.7; Third Office Action; dated Mar. 21, 2018, 28 pages.

GCC Examination Report Application Serial No. GC 2014-27077; dated Nov. 26, 2017, 5 pages.

Indian Application Serial No. 10446/DELNP/2015, Indian Examination Report; dated May 15, 2018, 6 Pages.

GCC Application Serial No. 2014/27077; Second Examination Report; dated May 31, 2018, 3 pages.

\* cited by examiner

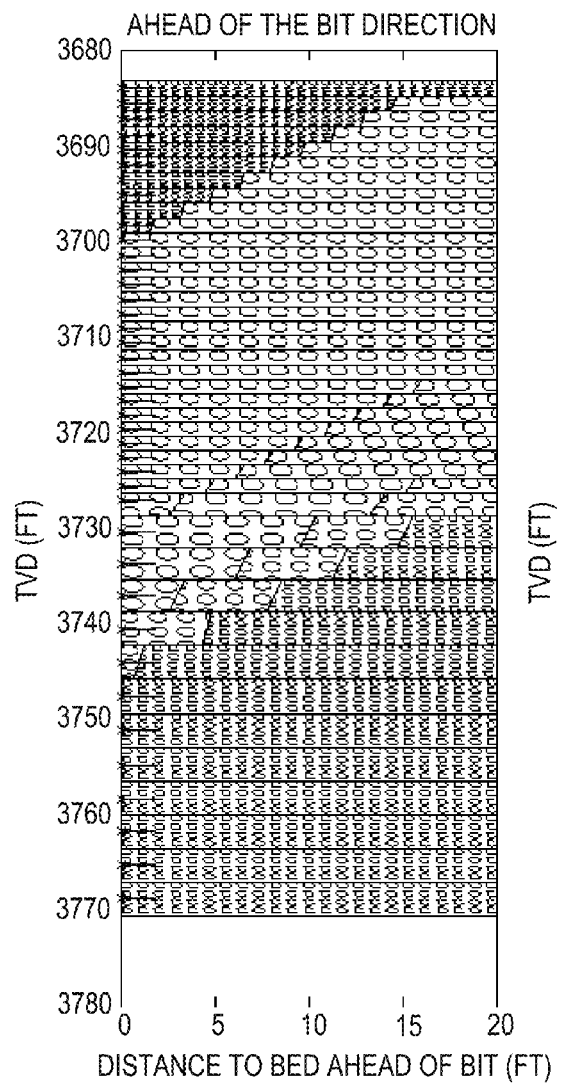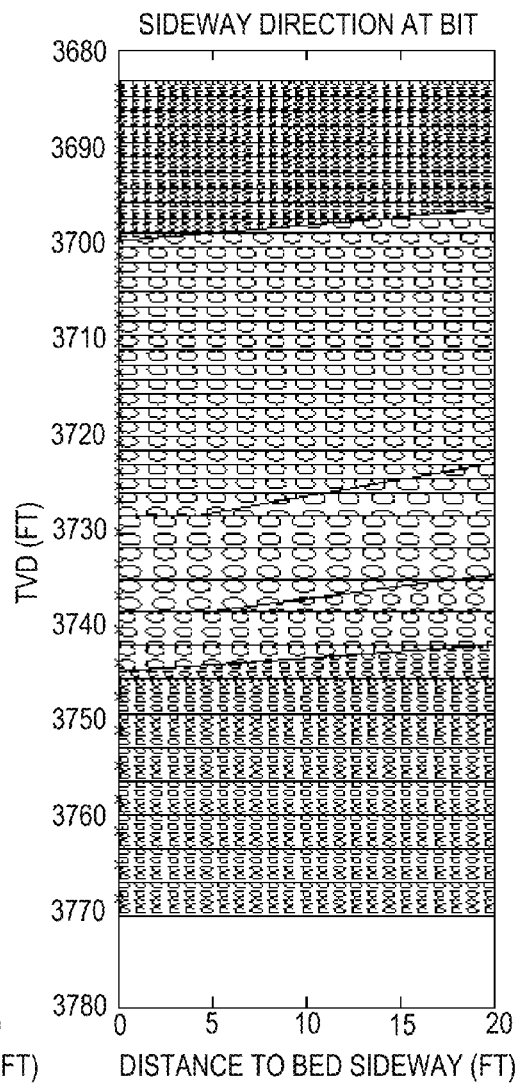
FIG. 5C
FIG. 5D

LOGGING WHILE DRILLING (LWD) STEERING VISUALIZATION TOOL METHODS AND SYSTEMS

BACKGROUND

In the past, properties of an earth formation have been estimated, modeled or predicted prior to drilling into the formation. However, the actual properties of a particular part of a formation are typically not known until after a drill bit drills into that part of the formation. Thus, operators in those circumstances cannot make proactive or preemptive decisions based on advance knowledge of the actual properties of the formation prior to the drill bit cutting into the formation.

BRIEF DESCRIPTION OF THE DRAWINGS

Accordingly, there are disclosed herein various logging while drilling (LWD) steering visualization tool systems and methods.

DETAILED DESCRIPTION

Figure 1:
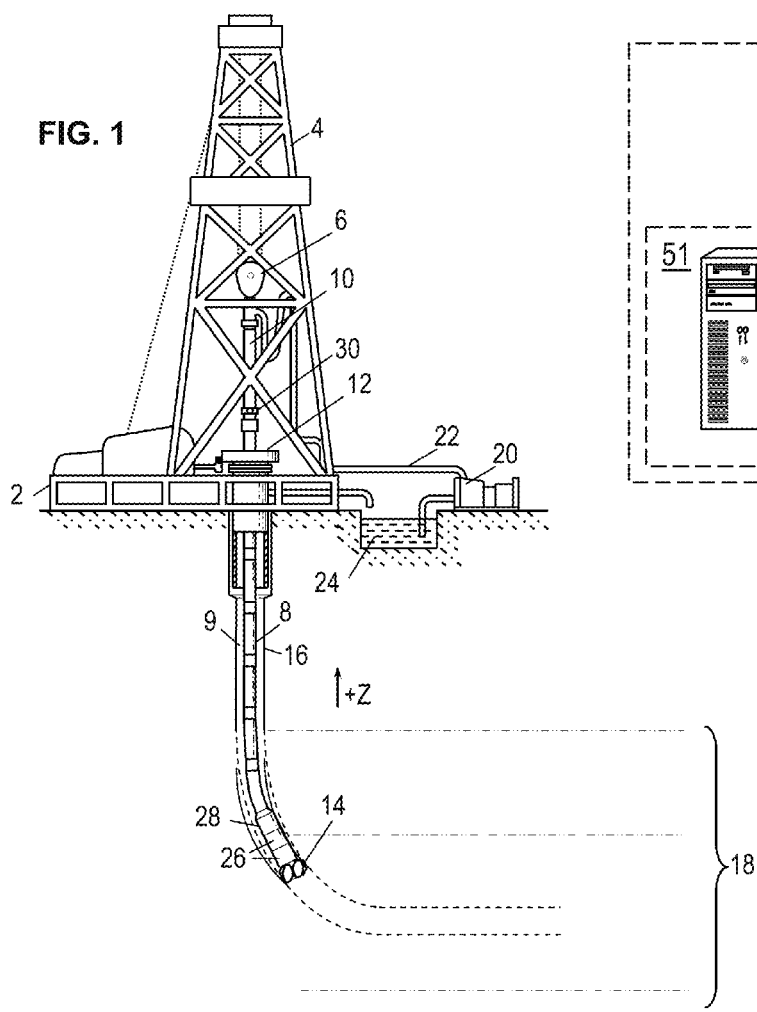
FIG. 1 shows an illustrative logging while drilling (LWD) environment.

Representatively and schematically illustrated in FIG. 1 is a logging while drilling (LWD) environment. In FIG. 1, a drilling platform 2 supports a derrick 4 having a traveling block 6 for raising and lowering a drill string 8. A drill string kelly 10 supports the rest of the drill string 8 as it is lowered through a rotary table 12. The rotary table 12 rotates the drill string 8, thereby turning a drill bit 14. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus 9 around drill string 8, and into a retention pit 24. The drilling fluid transports cuttings from the borehole 16 into the pit 24 and aids in maintaining the integrity of the borehole. Depending on the job requirements, the drilling fluid may be oil-based (with a high resistivity) or water-based (with a low resistivity).

The drill bit 14 is just one piece of an open-hole LWD assembly that includes one or more drill collars 26 and logging tool 28. Drill collars 26 are thick-walled steel pipe sections that provide weight and rigidity for the drilling process. The logging tool 28 (which may be built in to the drill collars) gather measurements of various drilling or formation parameters. As an example, logging instrument 28 may be integrated into the bottom-hole assembly near the bit 14 to collect look-ahead and/or look around measurements. The collected measurements may be plotted and used for steering the drill string 8 as described herein.

Measurements from the logging tool 28 can be acquired by a telemetry sub (e.g., built in to logging tool 28) to be stored in internal memory and/or communicated to the surface via a communications link. Mud pulse telemetry is one common technique for providing a communications link for transferring logging measurements to a surface receiver 30 and for receiving commands from the surface, but other telemetry techniques can also be used.

Figure 2:
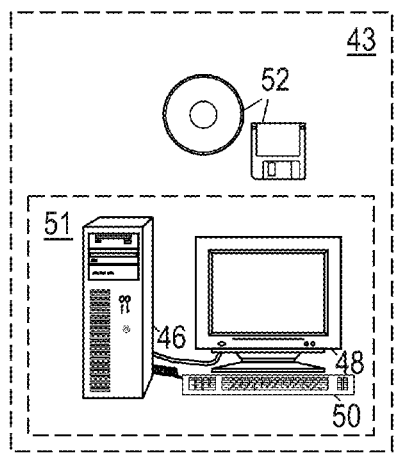
FIG. 2 shows an illustrative computer system for managing logging operations including steering visualization options.

In accordance with embodiments, measurements collected from the logging tool 28 may processed by a computer system executing a steering visualization software tool with various map view options. FIG. 2 shows an illustrative computer system 43 for managing logging operations and/or steering visualization options. The computer system 43 may correspond to, e.g., an onsite logging facility for the LWD system of FIG. 1, or a remote computing system that receives logging measurements from such logging facilities. The computer system 43 may include wired or wireless communication interfaces receiving such logging measurements. As shown, the illustrative computer system 43 comprises user workstation 51 with a computer chassis 46 coupled to a display device 48 and a user input device 50. The computer chassis 46 includes one or more information storage devices for accessing software (shown in FIG. 2 in the form of removable, non-transitory information storage media 52) that configures the computer system to interact with a user, enabling the user to process the logging data and, in the case of local logging facilities, to manage logging operations including analyzing borehole conditions. The software may also be downloadable software accessed through a network (e.g., via the Internet). In some embodiments, illustrative computer system 43 executes steering visualization software that provides various map view options to facilitate formation analysis and LWD steering decisions.

Figure 3:
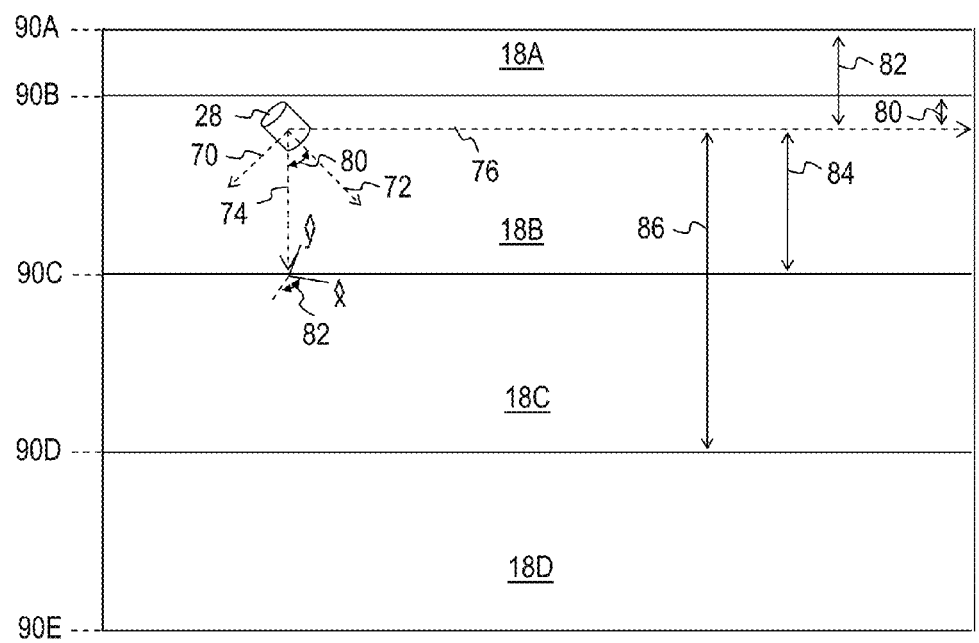
FIG. 3 shows an illustration of a LWD tool in a subterranean environment along with various parameters of interest.

FIG. 3 shows an illustration of logging tool 28 in a subterranean environment with multiple formation beds or layers 18A-18D and bed boundaries 90A-90E. Although the formation beds 18A-18D and bed boundaries 90A-90E are represented as a two-dimensional (2D) image with straight lines, it should be understood that subterranean environments usually have sloped or curved formation beds and bed boundaries.

In FIG. 3, various direction arrows are shown. Arrow 70 represents the direction to the side of the logging tool 28 extending radially outward, arrow 72 represents the direction ahead of the logging tool 28, arrow 74 represents a true vertical direction extending downward from the logging tool 28, and arrow 76 represents a true horizontal direction extending sideways from the logging tool 28. Various angles are also shown in FIG. 3, including angle 80, which corresponds to the relative dip of logging tool 28 (i.e., the angle between arrow 74 and arrow 72), and angle 82, which corresponds to the azimuth for bed boundary 90C with respect to a tool azimuth reference point.

Also shown in FIG. 3 are various arrows to indicate the vertical distance between the logging tool 28 and different bed boundaries. More specifically, arrow 80 represents the vertical distance between logging tool 28 and bed boundary 90B, arrow 82 represents the vertical distance between logging tool 28 and bed boundary 90A, arrow 84 represents the vertical distance between logging tool 28 and bed boundary 90C, and arrow 86 represents the vertical distance between logging tool 28 and bed boundary 90D.

In accordance with some embodiments, distance information and angle information such as the distances and angles described in FIG. 3 are plotted or mapped by steering visualization software that receives ahead of bit and/or around bit measurements. Without limitation, the parameters that are displayed or represented by steering visualization software may include physical parameters such as tool orientation, formation resistivity values, vertical resistivity, horizontal resistivity, relative dip angles, relative azimuth angles, bed dips, bed azimuths, drill path, distance to bed boundaries, water saturation, and formation porosity. In addition, trust parameters such as uncertainty estimates, inversion type information, and/or comparison information may be displayed or represented by steering visualization software. By displaying or representing physical parameters and trust parameters, the steering visualization software enables an LWD operator to make steering decisions for an LWD tool or to review past steering operations as described herein.

Figure 4:
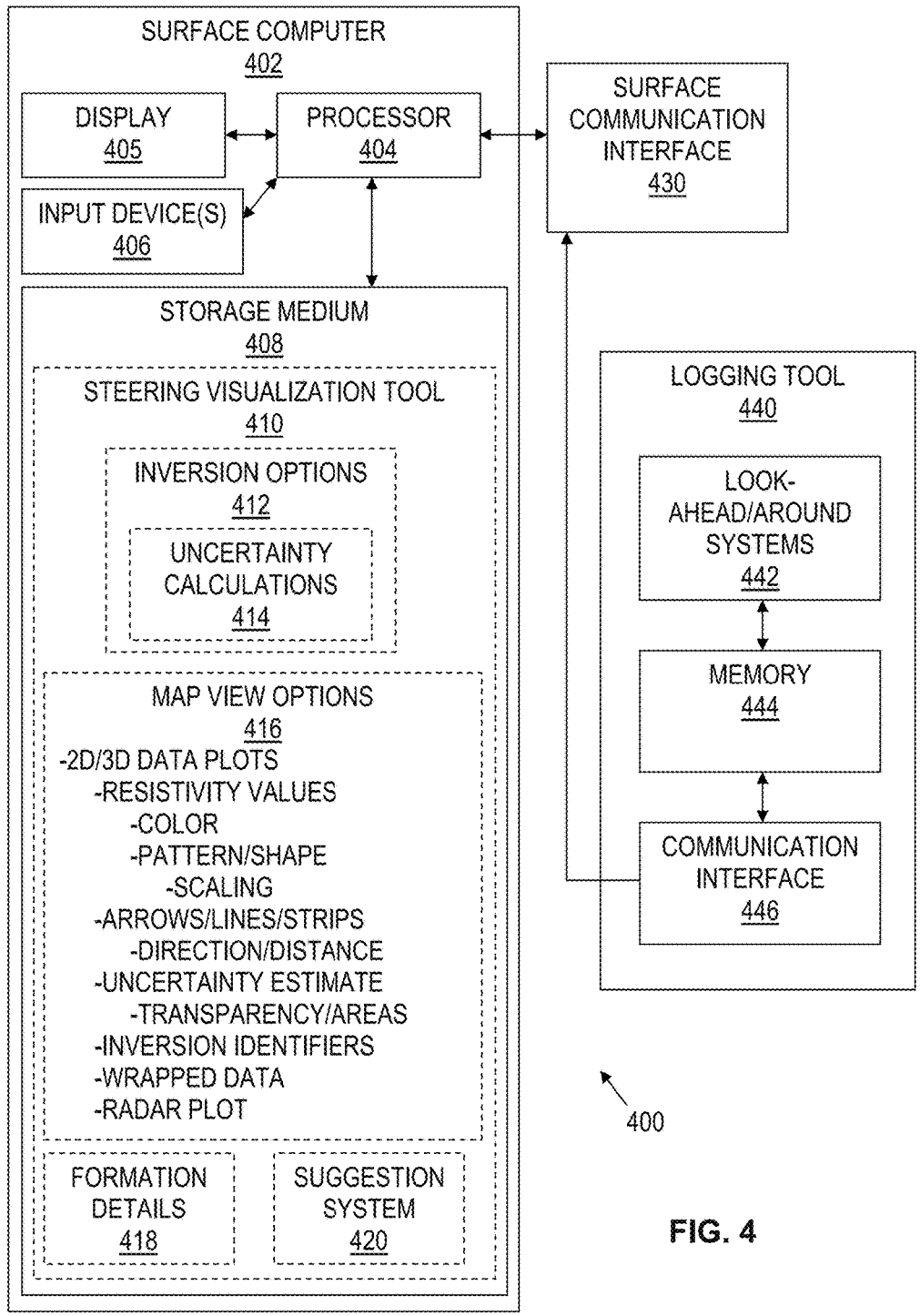
FIG. 4 shows a block diagram of an LWD visualization system.

FIG. 4 shows a block diagram of an illustrative LWD visualization system 400. The LWD visualization system 400 includes a logging tool 440 (e.g., logging tool 28) with look-ahead/around systems 442 to collect ahead of bit and/or around bit measurements. The logging tool 440 also includes memory 444 to store collected measurements and/or to store logging instructions. A communication interface 446 of the logging tool 440 enables ahead of bit and/or around bit measurement data to be transferred to a surface communication interface 430. The surface communication interface 430 provides the ahead of bit and/or around bit measurement data to a surface computer 402.

As shown in FIG. 4, the surface computer 402 includes a processor 404 coupled to a display 405, input device(s) 406, and a storage medium 408. The display 405 and input device(s) 406 function as a user interface that enables a LWD operator to view information and to input steering commands or interface option commands (to control how information is viewed). The storage medium 408 stores a steering visualization software tool 410 that, when executed by processor 404, provides various map view options 416 based on ahead or bit and/or around bit measurements collected by the logging tool 440.

In some embodiments, the input device(s) 406 include a touch screen, mouse, and/or keyboard operable with a user interface to provide user inputs to switch between different map views, to display multiple map views, to enable different map view features, and/or to disable different map view features. Further, the input device(s) 406 enable an operator to interact with a steering visualization interface that assists the operator with steering decisions using one or more of the map views described herein.

The map view options 416 include various two-dimensional (2D) or three-dimensional (3D) data plot options in which tool position/orientation and formation properties (e.g., resistivity or electromagnetic permeability) are represented by colors, patterns, and/or shapes. Particular formation materials also may be identified by colors, patterns, and/or shapes. In some embodiments, the patterns or shapes used to represent formation properties have a default appearance to represent isotropic formation properties and a scaled appearance (relative to the default appearance) to represent anisotropic formation properties. The 2D/3D data plot options may include use of arrows, lines, and/or strips to represent directions and distances (e.g., the direction and distance between the drill bit and a bed boundary). The 2D/3D data plot options also may include an uncertainty estimate for the data being displayed or represented. In some embodiments, uncertainty is represented by varying the transparency of data being displayed (higher transparency representing higher uncertainty), varying the shade of data being displayed, or by displaying an area of uncertainty for data being displayed. The 2D/3D data plot options also may include displaying data corresponding to different inversions along with inversion identifiers. The 2D/3D data plot options also may include wrapping plotted data that extends beyond map view boundaries. The 2D/3D data plot options also may include radar style plots to show the distance and direction between bed boundaries and the drill bit.

In some embodiments, storage medium 408 stores instructions that, when executed by processor 404, cause the processor 404 to display map views with map view features and/or options as described herein. The instructions, when executed by the processor 404, may further cause the processor 404 to switch between different map views in response to a user request. The instructions, when executed by the processor 404, may further cause the processor 404 to display multiple map views in response to a user request. The instructions, when executed by the processor 404, may further cause the processor 404 to enable or disable different map view features in response to a user request.

The map view options 416 described herein display data based on inversion options 412 and corresponding uncertainty calculations 414 employed for the steering visualization software tool 410. Further, in some embodiments, the map view options 416 described herein are interactive and display additional formation information when interactive plotted data is selected by a user. To support such interactive operations, the steering visualization software tool 410 includes a formation details module 418. The steering visualization software tool 410 also includes a suggestion system 420 to suggest steering actions based on predetermined criteria and the collected ahead of bit and/or around bit measurements. The suggestion system 420 may display steering suggestions as lines, arrow, or other direction indicators on a map view option 416 of the steering visualization software tool 410. The suggestion system 420 also may display an alarm in response to predetermined criteria (e.g., the distance to a nearest bed boundary being less than a threshold amount).

Figure 5A:
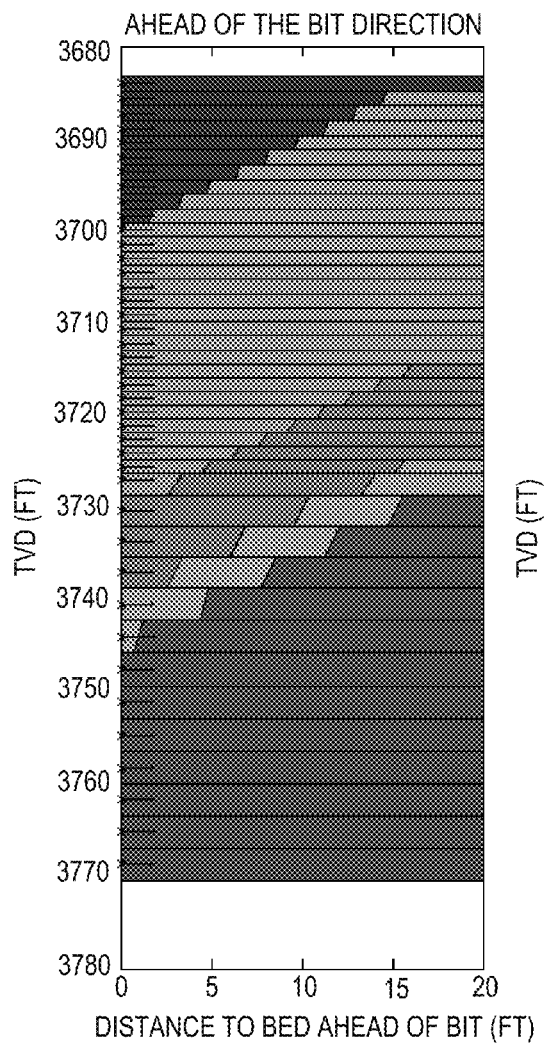
FIGS. 5A-5U show illustrative map view options for a steering visualization tool.
Figure 5B:
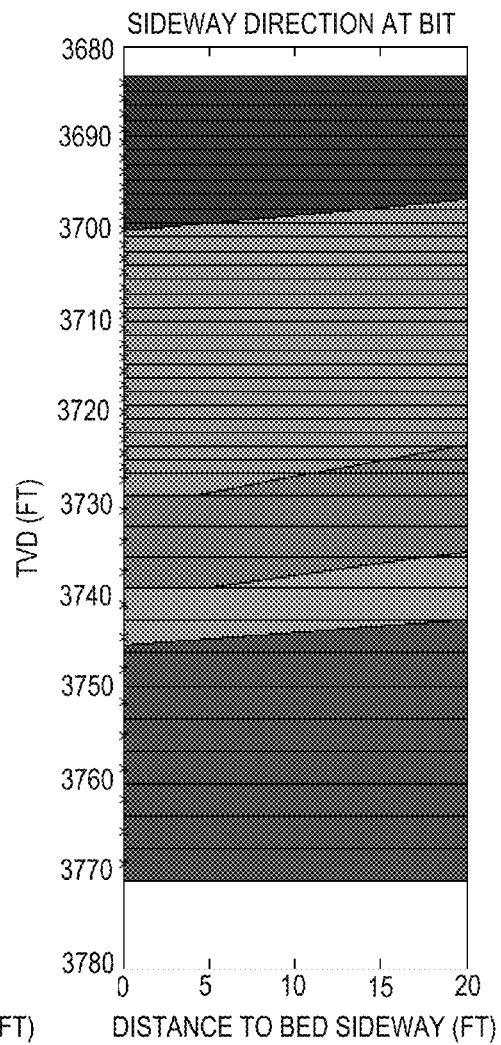
Figure 5E:
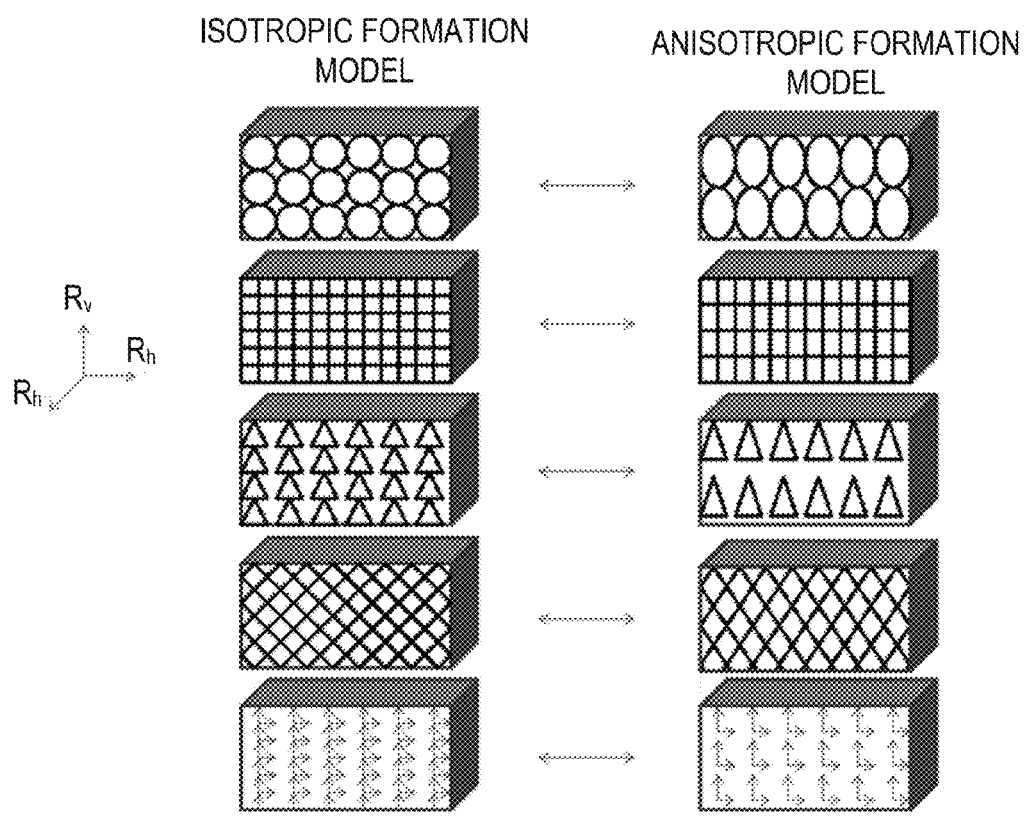
Figure 5F:
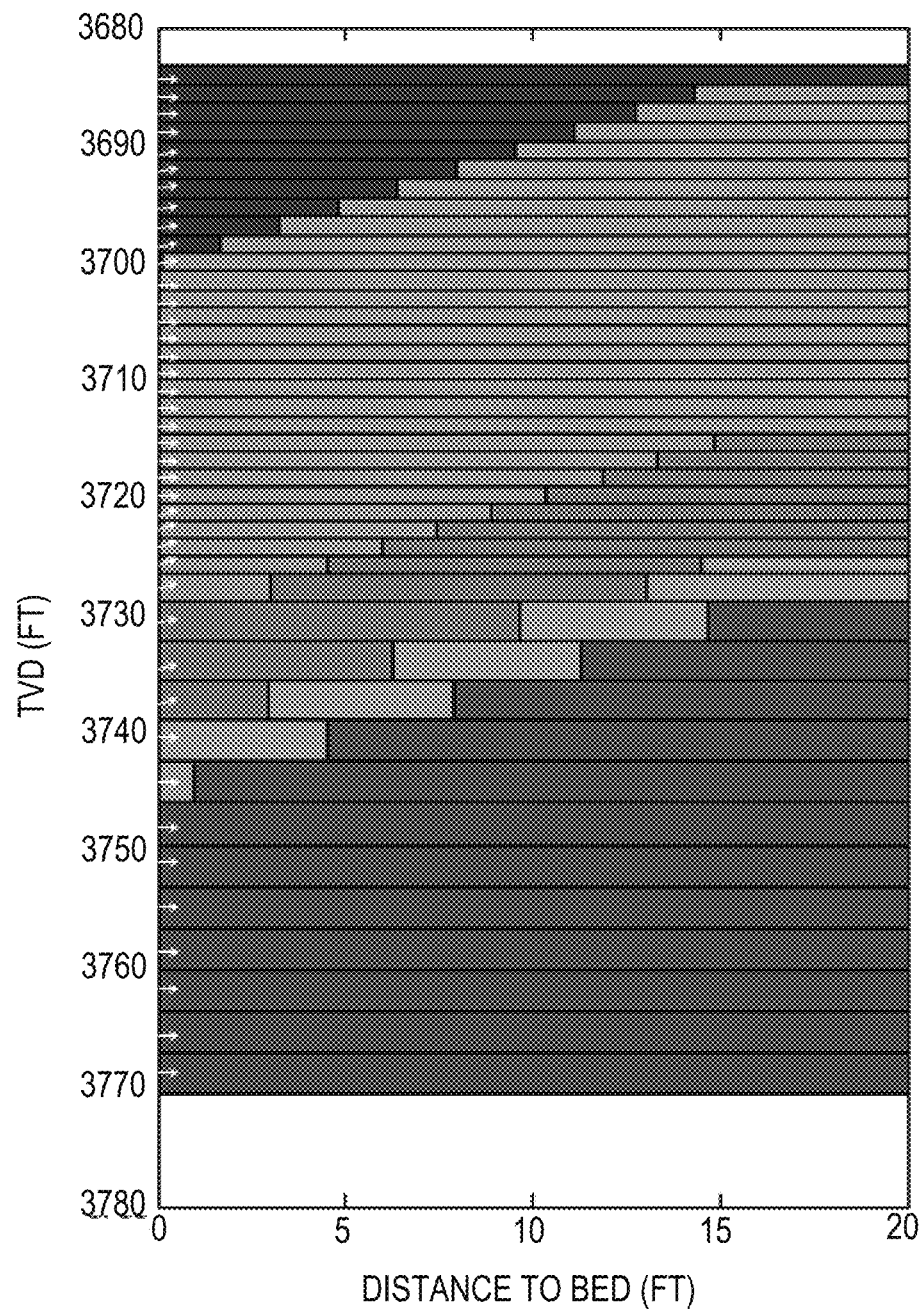
Figure 5G:
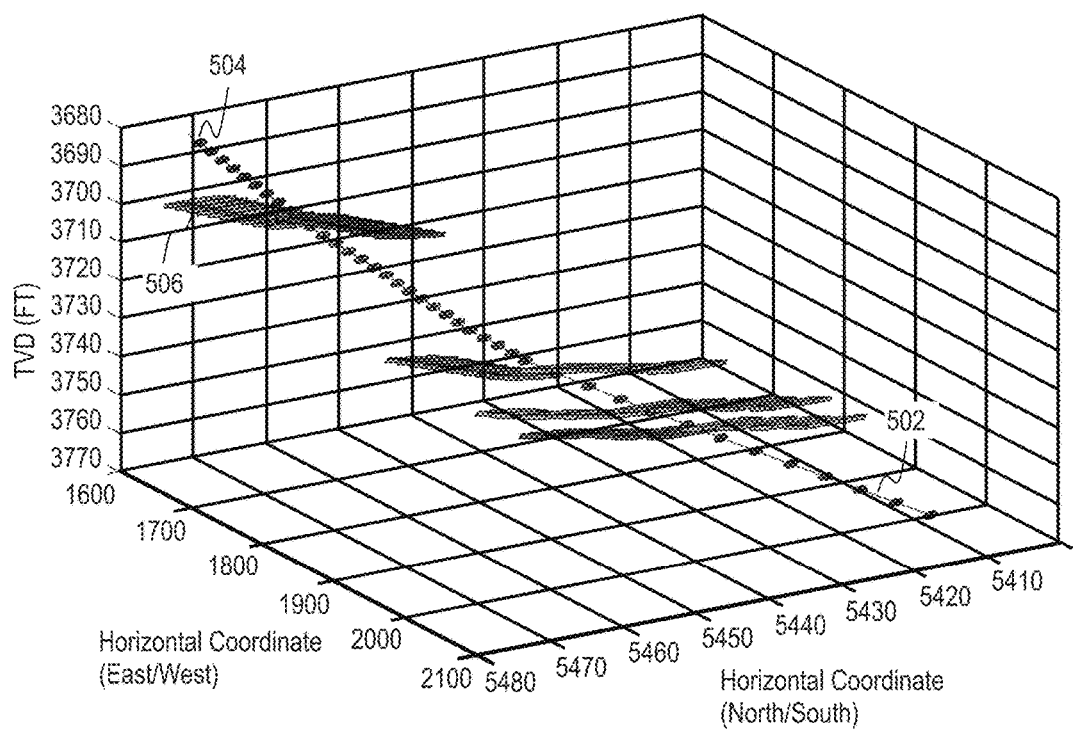
Figure 5H:
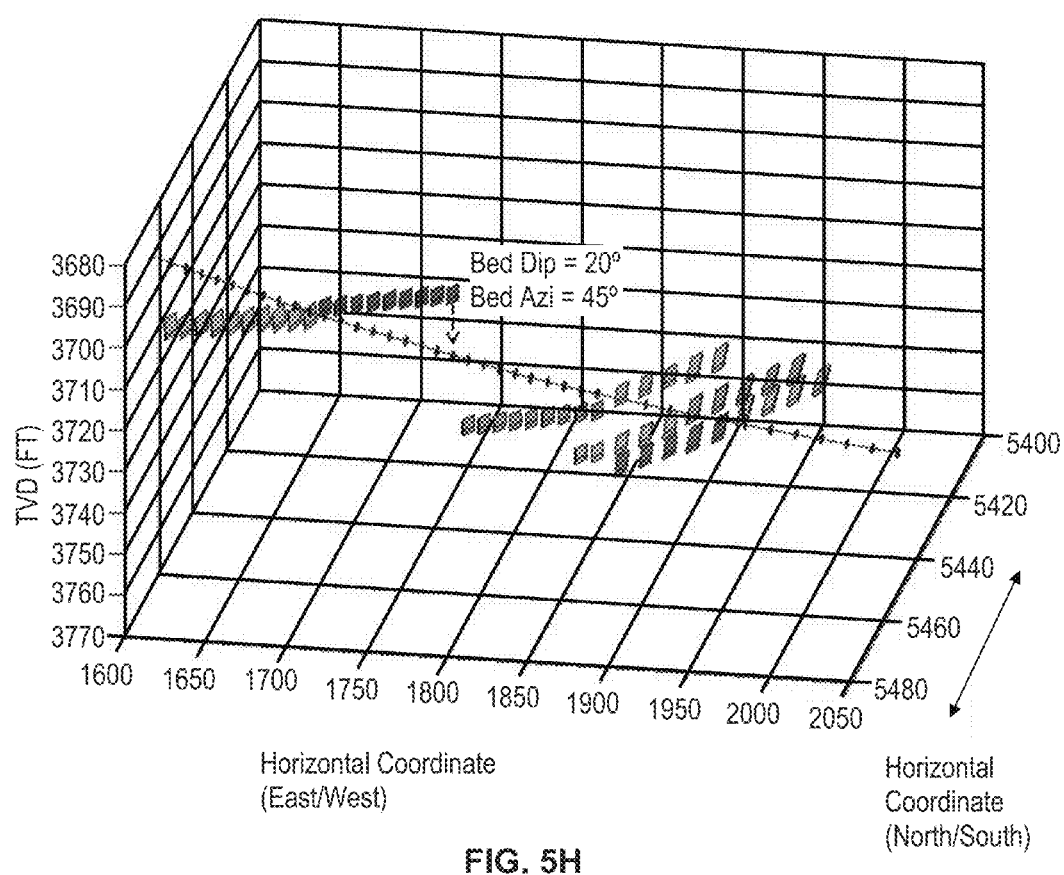
Figure 5I:
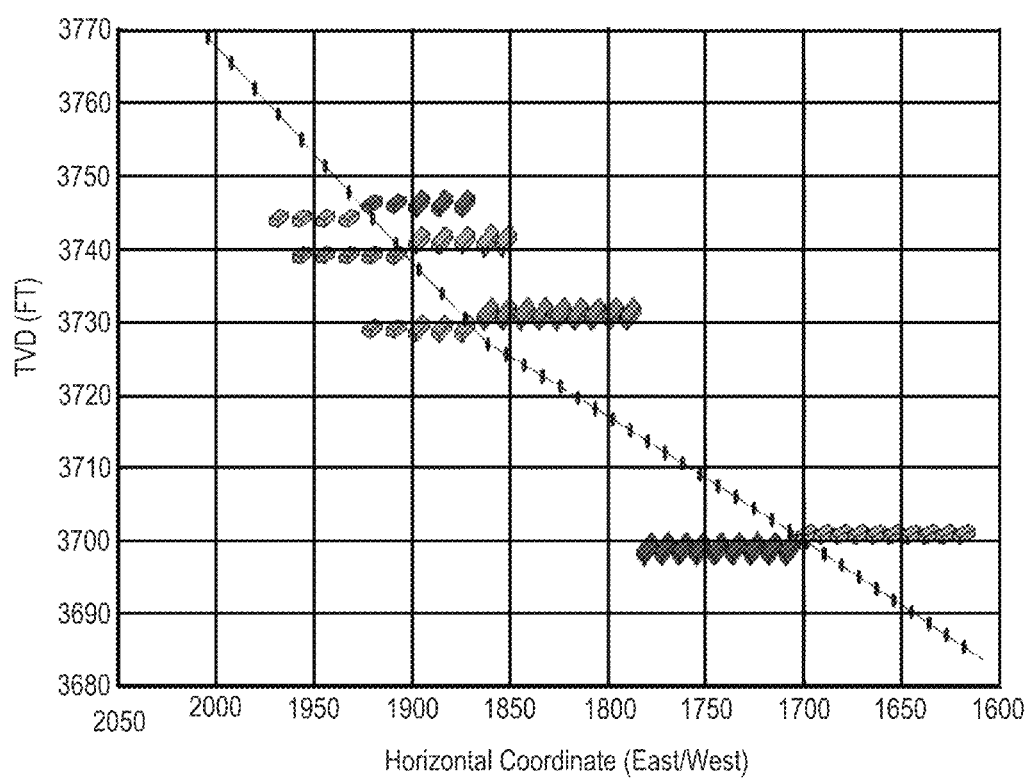
Figure 5J:
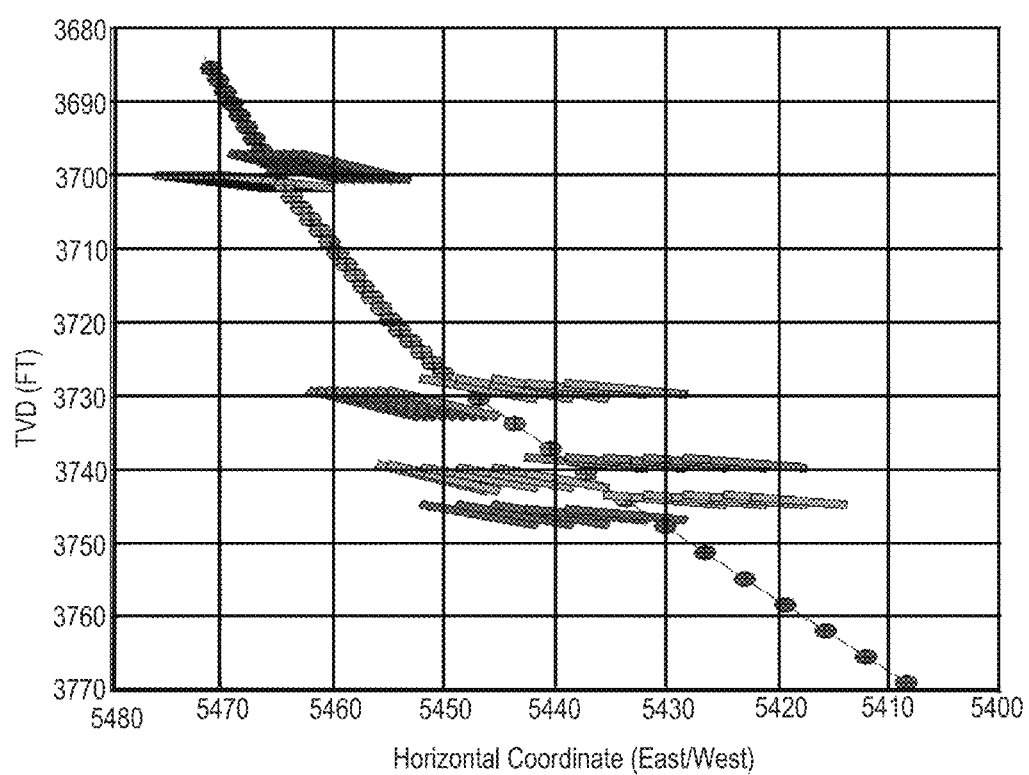
Figure 5K:
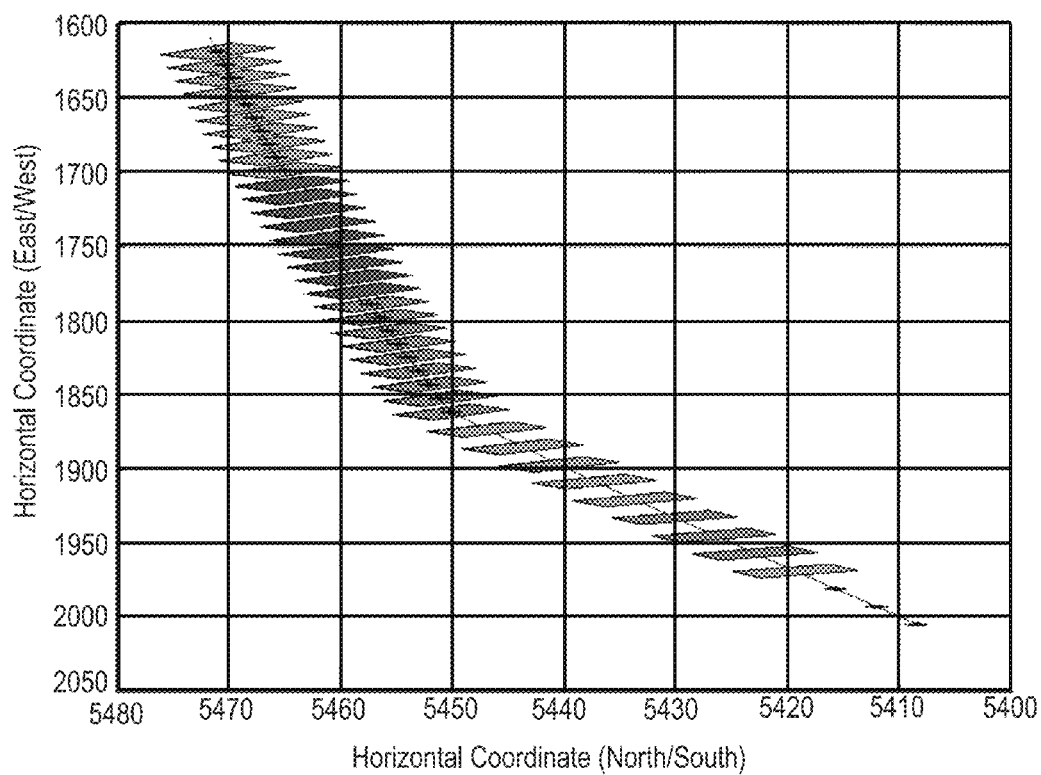
Figure 5L:
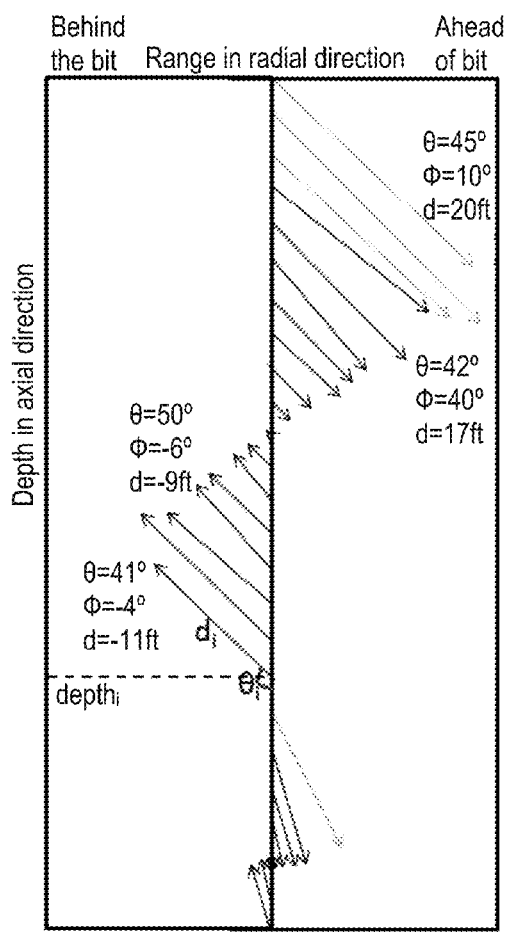
Figure 5M:
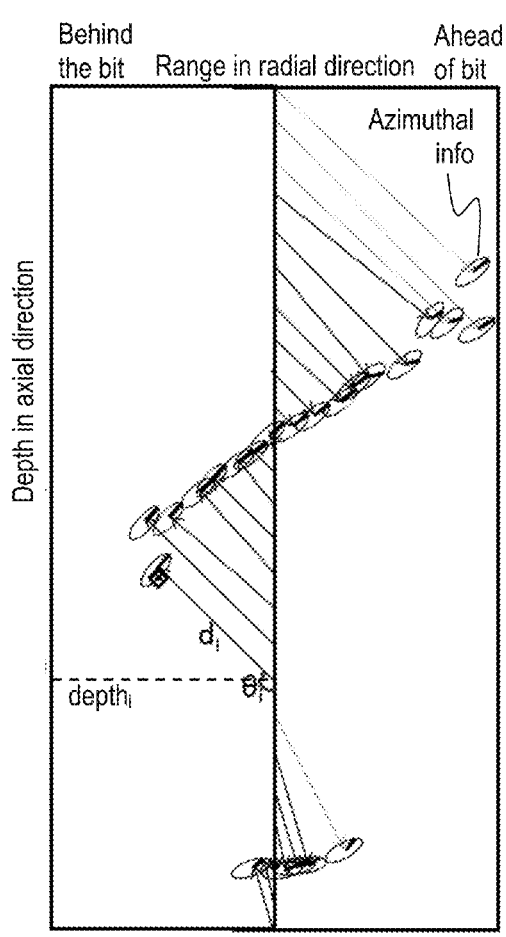
Figure 5N:
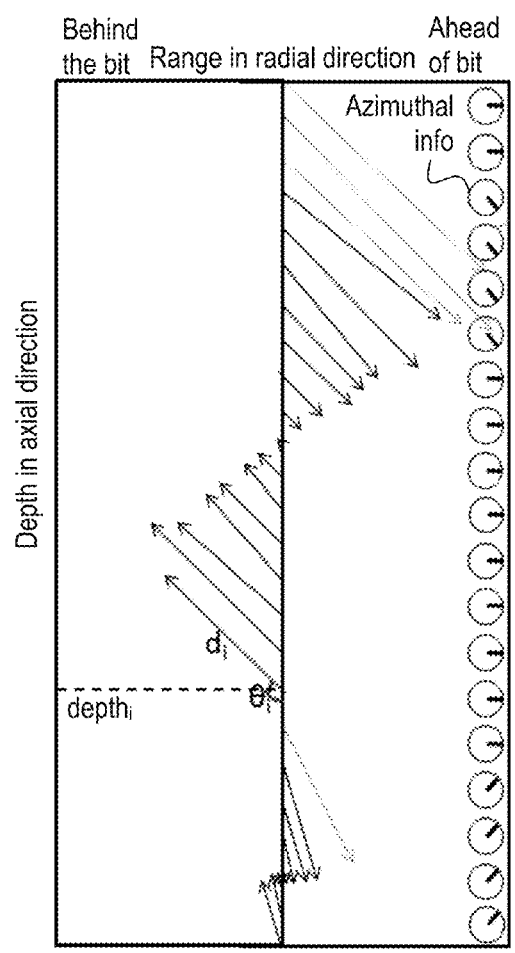
Figure 5O:
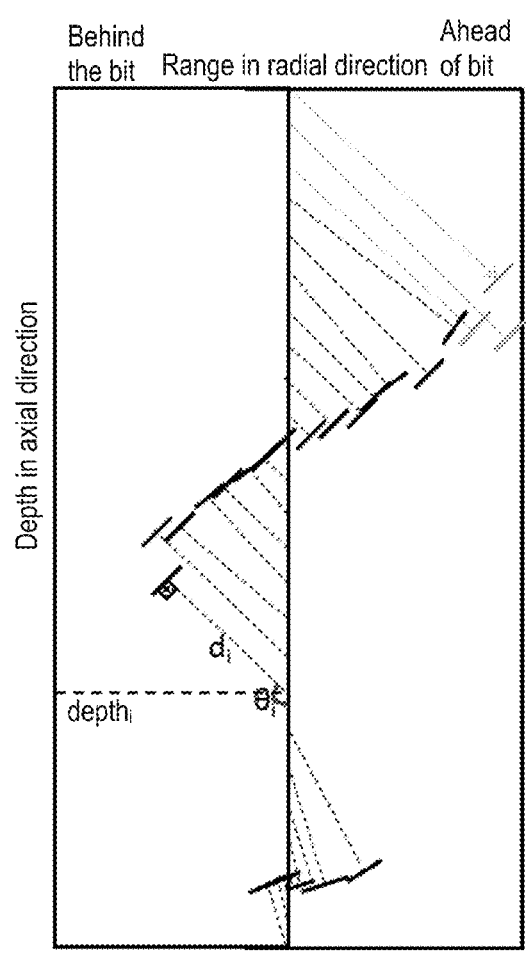
Figure 5P:
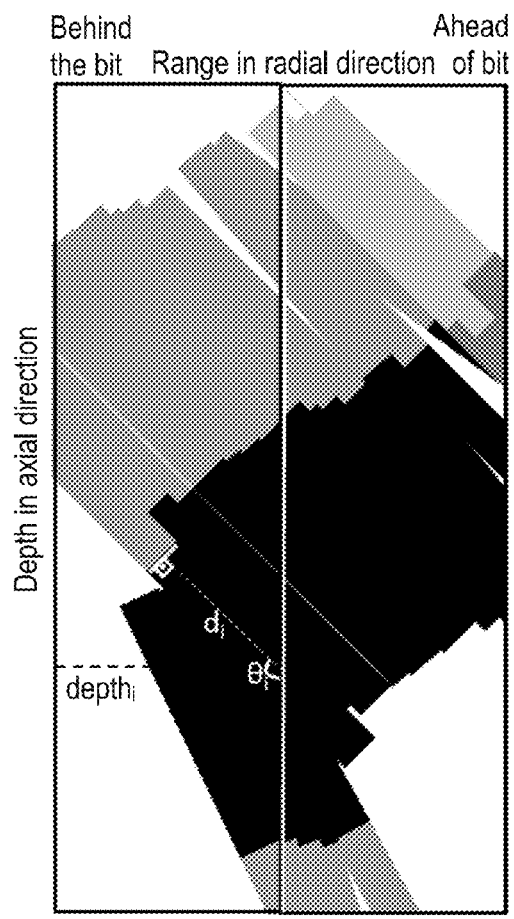
Figure 5Q:
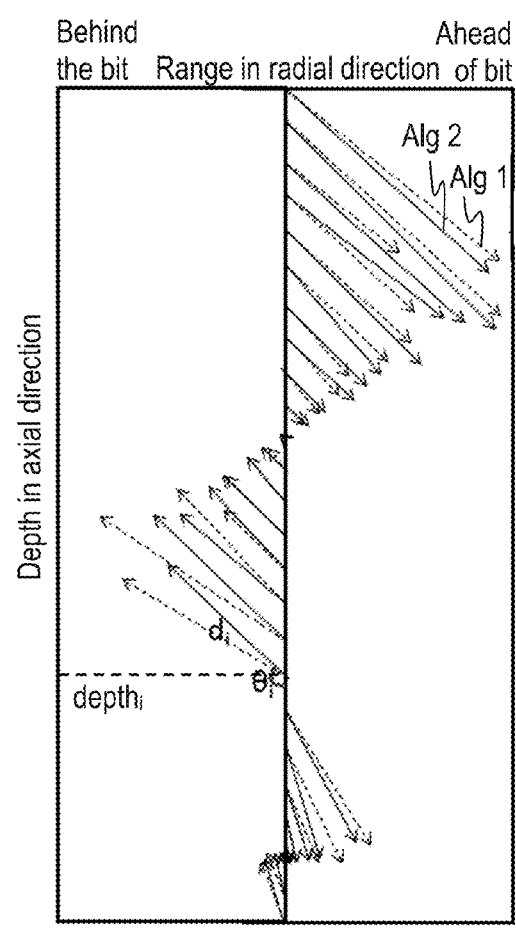
Figure 5R:
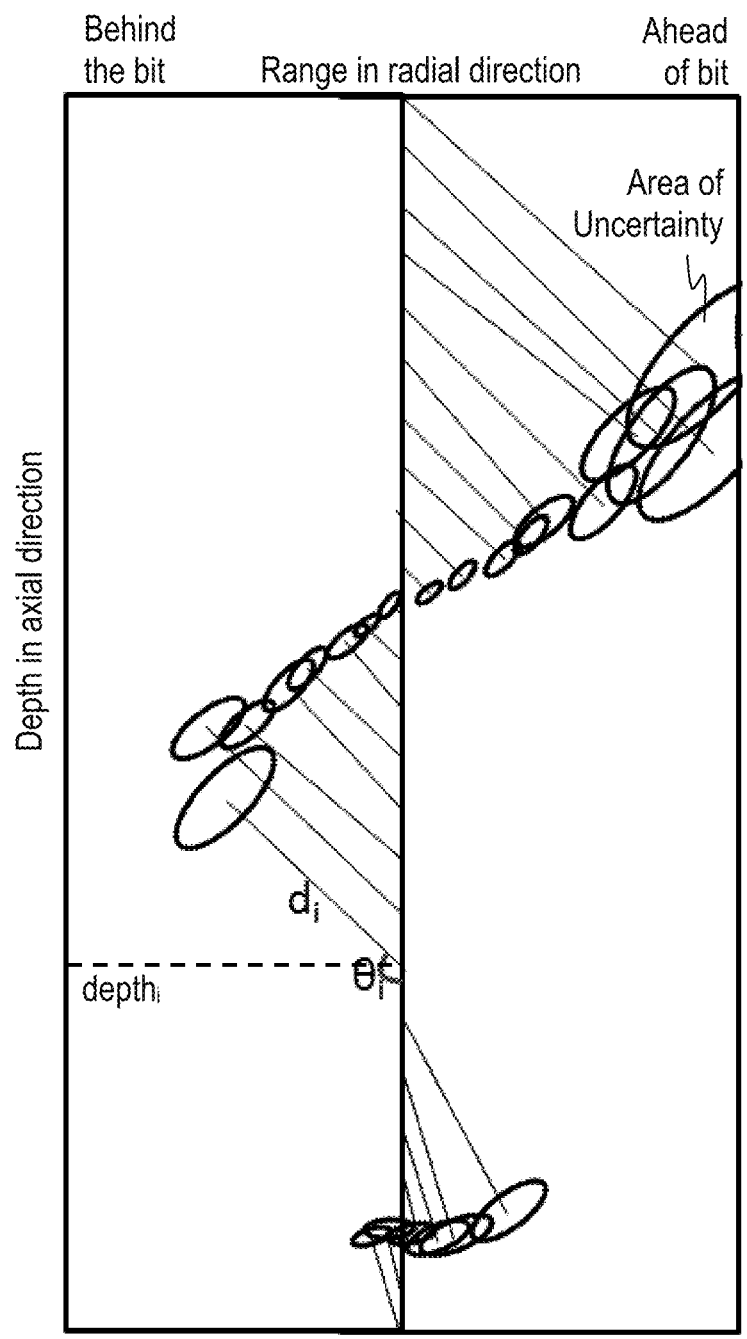
Figure 5S:
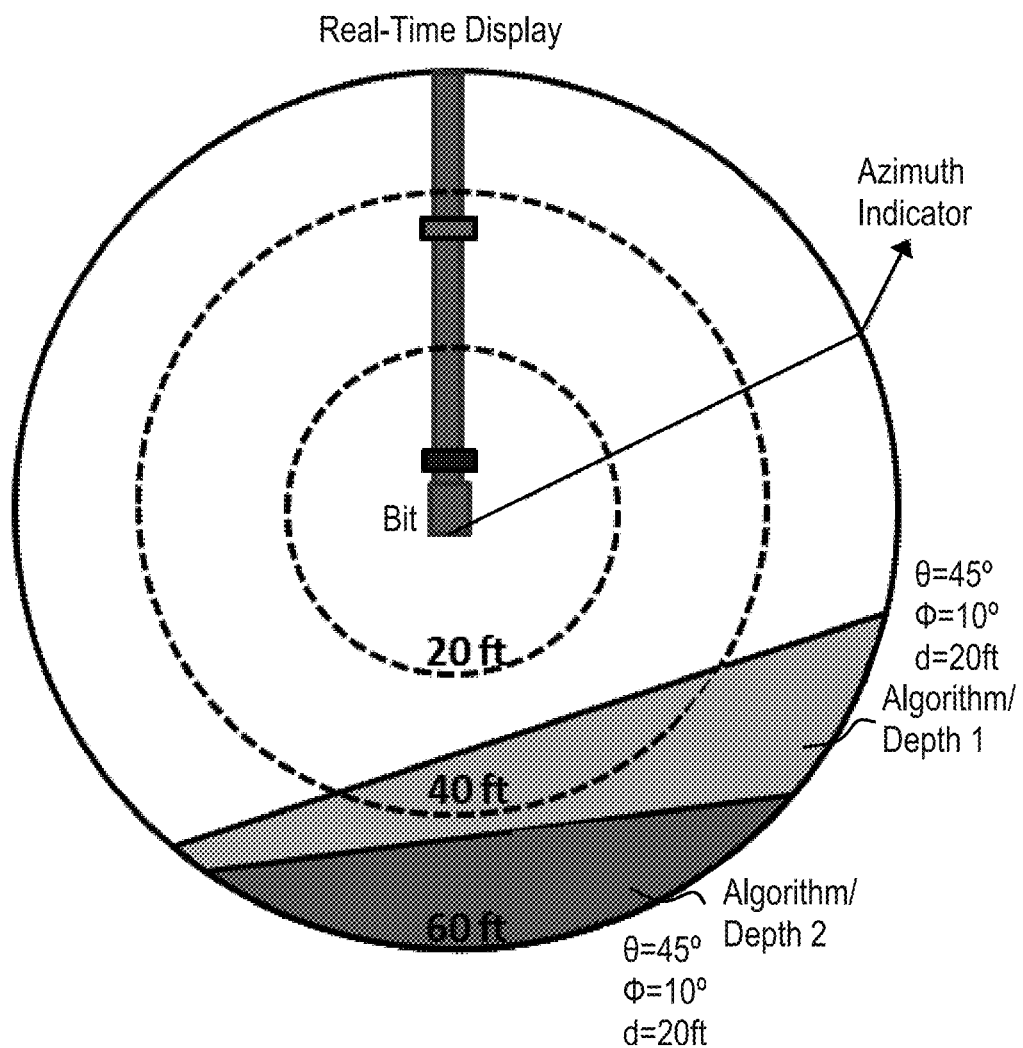
Figure 5T:
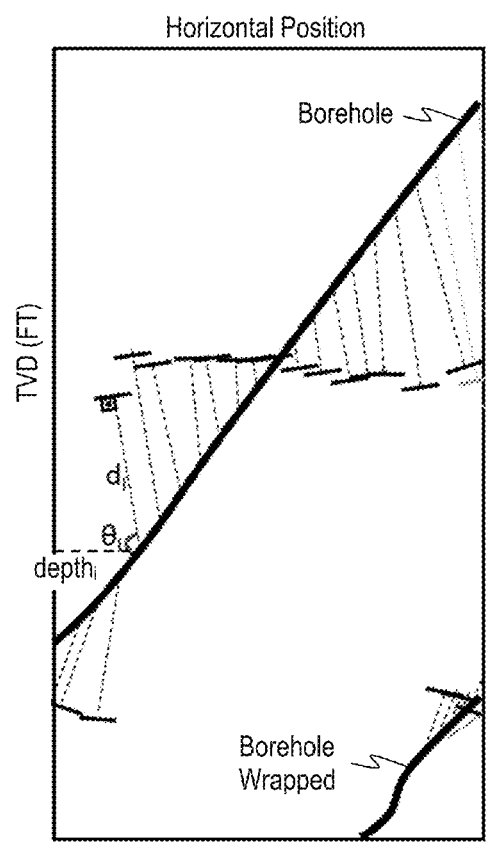
Figure 5U:
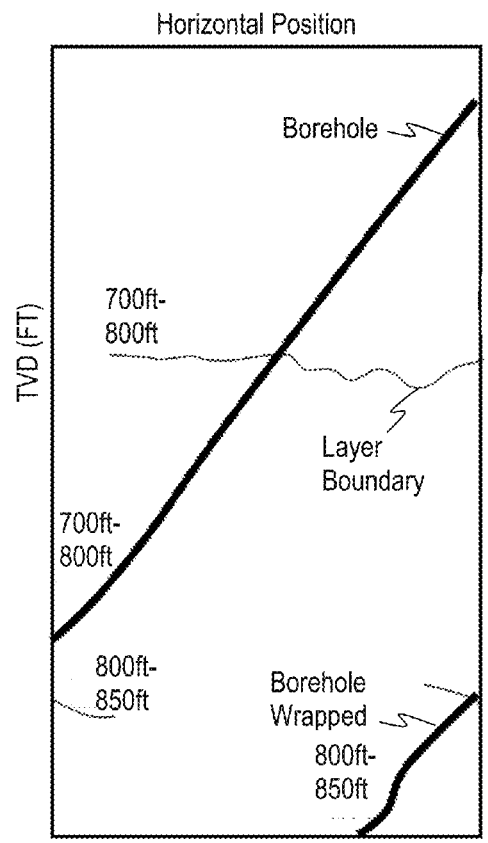

FIGS. 5A-5U show various illustrative map view options for the steering visualization software tool 410. Although not shown here, the various map view options of FIGS. 5A-5U may include color or symbol legends to help an operator interpret the displayed data. Some of the map view options (see e.g., FIGS. 5A-5F, and 5L-5S) provide easy to read 2D map views to facilitate steering decisions. As an example, FIGS. 5A-5F show real-time look-ahead or look-around measurements within the range of the logging tool, but do not show behind the bit data. In alternative embodiments, map views similar to FIGS. 5A-5F may display behind the bit measurements or prior inversion information. For example, a negative distance value and related formation measurements may be displayed for each true vertical depth (TVD) of FIGS. 5A-5F to show behind the bit measurements. Meanwhile, FIGS. 5L-5S provide easy to read 2D map views of ahead of bit and behind bit measurements to show where the bit has been and where the bit is headed within a small range (e.g., the range of the logging tool). Other map view options (see e.g., FIGS. 5G-5J, 5T, and 5U) enable operators to view the drill path over a long distance to review steering strategies and subsurface formations. Other map view options (see e.g., FIG. 5K) enable an operator to view bed boundary details.

FIG. 5A shows a 2D map view option that plots look-ahead distance to bed boundary as a function of true vertical depth (TVD), and that uses different colors to identify different formation resistivity values. In different embodiments, color may be used to identify a resistivity value, an electromagnetic permeability value, or other formation parameters discernible by logging sensors/tools. In FIG. 5A, the ahead of bit data represented for each TVD is in the direction of arrow 72 (see FIG. 3). Thus, for each TVD, distance 0 (zero) corresponds to a reference point on or near the bit, where represented data is shown with respect to that reference point (up to 20 ft or another distance value within a logging tool's range) in the direction of arrow 72. As an example, at TVD 3730, three formation materials and two boundaries are ahead of the bit within 20 ft of the reference point in the direction of arrow 72. More specifically, at TVD 3730, a first formation material is between 0-10 ft ahead of the reference point, a second formation material is between 10-15 ft ahead of the bit, and a third formation material is between 15-20 ft ahead of the bit in the direction of arrow 72. Thus, at TVD 3730, there are two bed boundaries within 20 ft of the reference point in the direction of arrow 72. One boundary is approximately 10 ft ahead of the bit while the other boundary is approximately 15 ft ahead of the bit. Each of these bed boundaries is represented by a line, which corresponds to the relative dip of the tool with respect to the bed boundary (i.e., angle 80 discussed for FIG. 3). It should be understood that this angle may vary for different bed boundaries and for different TVDs.

FIG. 5B shows a 2D map view option that plots "look-around" or "sideway" distance to the next bed boundary as a function of true vertical depth (TVD), and that uses different colors to identify different formation resistivity values. As mentioned for FIG. 5A, color may be used to identify a resistivity value, an electromagnetic permeability value, or other formation parameters discernible by logging sensors/tools. In FIG. 5B, the sideway distance data represented for each TVD is in the direction of arrow 70 (see FIG. 3). Thus, for each TVD, distance 0 (zero) corresponds to a reference point on or near the bit, where represented data is shown with respect to that reference point (up to 20 ft or another distance value within a logging tool's range) in the direction of arrow 70. As an example, at TVD 3700, two formation materials and one boundary are within 20 ft of the reference point in the direction of arrow 70. The bed boundary is represented by a line having an angle related to the dip angle (angle 80 in FIG. 3). It should be understood that this angle may vary for different bed boundaries and for different TVDs.

FIG. 5C shows a 2D map view option that plots look-ahead distance to bed boundary as a function of true vertical depth (TVD), and that uses pattern density (i.e., a higher pattern density represents a higher resistivity value) to identify different formation resistivity values. In different embodiments, pattern density or specific patterns may be used to identify a resistivity value, an electromagnetic permeability value, or other formation parameters discernible by logging sensors/tools. The represented data of FIG. 5C is the same as the represented data of FIG. 5A, except that pattern density is used in FIG. 5C to identify different formation resistivity values instead of color.

FIG. 5D shows a 2D map view option that plots look-around distance to bed boundary as a function of true vertical depth (TVD), and that uses pattern density to identify different formation resistivity values. In different embodiments, pattern density or specific patterns may be used to identify a resistivity value, an electromagnetic permeability value, or other formation parameters discernible by logging sensors/tools. The represented data of FIG. 5D is the same as the represented data of FIG. 5B, except that pattern density is used in FIG. 5D to identify different formation resistivity values instead of color.

FIG. 5E shows isotropic and anisotropic formation models, which may be employed in a given map view options. As shown in FIG. 5E, the anisotropic formation model is a scaled version of the isotropic formation model, which may correspond to a default pattern. When applied to map views, different scaling may be applied in different directions, where each scaling corresponds to the formation property in that direction. The pattern itself may vary. FIG. 5E shows various illustrative patterns that may be suitable for showing anisotropy, including shape patterns, line/arrow patterns, and crosshatch patterns.

FIG. 5F is similar to FIG. 5A and shows a 2D map view option that plots look-ahead distance to bed boundary as a function of true vertical depth (TVD), and that uses different colors to identify different formation resistivity values. In FIG. 5F, the lines representing bed boundaries are straight and do not convey relative dip angle information. Instead, relative dip angle information is represented for each distinct TVD as an arrow with its tail at distance 0 (zero). Each arrow or other relative dip angle indicator represents the relative dip between the bit or reference point and the nearest bed boundary. In alternative embodiments, the size, the position, and/or the relative dip angle indicator may vary. Further, a numeric value may be shown in addition to or instead of a shape-based indictor. Further, the relative dip angle information may be omitted for some TVDs.

Although not shown, a 2D map view similar to FIG. 5B may be displayed, where bed boundary lines are straight and a sideway relative to dip angle indicator (i.e., the 90 degree complement of dip angle 80 in FIG. 3) is shown for each TVD. In alternative embodiments, the size, the position, and/or the sideway relative to dip angle indicator may vary. Further, a numeric value may be shown in addition to or instead of a shape-based indictor. It should be understood that the angle value may vary for different bed boundaries and for different TVDs. Further, the sideway relative to dip angle indicator may be omitted for some TVDs.

FIGS. 5A-5F illustrate 2D map views that display formation properties (e.g., formation resistivity and/or electromagnetic permeability) in a single predetermined direction with respect to a reference point for the tool as a function of depth. In some embodiments, the predetermined direction corresponds to an ahead of bit direction relative to the reference point. In alternative embodiments, the predetermined direction corresponds to a sideways of bit direction relative to the reference point. Further, a sloped line may be displayed in the map views of FIGS. 5A-5F to represent a bed boundary between two formation layers displayed for a depth value, where an angle of the sloped line corresponds to a relative dip angle indicator between the predetermined direction and the bed boundary. In alternative embodiments, a straight line may be displayed in the map views of FIGS. 5A-5F to represent a bed boundary between two formation layers displayed for a depth value, where a relative dip angle indicator separate from the straight line is displayed for the depth value to represent an angle between the predetermined direction and the bed boundary. The relative dip angle indicator may be an arrow whose tail is at or near the reference point for the tool, where an angle of the arrow with respect to the reference point conveys relative dip angle information. In some embodiments, a distinct relative dip angle indicator for each depth value with a bed boundary may be displayed in the map views of FIGS. 5A-5F.

To display formation properties (e.g., formation resistivity and/or electromagnetic permeability), the map views of FIGS. 5A-5F may use color, where different colors represent different formation property values. In alternative embodiments, the map views of FIGS. 5A-5F may use patterns to display formation properties, where different pattern densities represent different formation property values. Further, the pattern may be scaled in at least one direction relative to a default pattern to represent anisotropic formation property values.

FIG. 5G shows a 3D map view option that plots a drill path and bed boundaries, and that uses different colors, shapes, or patterns to identify different formation attribute values for the bed boundaries. In FIG. 5G, a cube or other shape is positioned along the drill path at each TVD value, where the orientation of the cube or shape may correspond to the orientation of the tool. By plotting ahead of bit and/or around bit data at multiple TVDs along the well path, a representation of bed boundaries within the logging tool range is displayed. The bed boundaries may be represented by color, shapes, prisms, or lines, where the displayed angle or inclination of the bed boundary corresponds to the dip of the boundary with respect to the perspective view provided by the 3D map view. The example 3D map view of FIG. 5G may be plotted, for example, by plotting look around bit data for each TVD. As a specific example, tool object 504 along well path 502 may be associated with a formation property object 506, where the angle of tool object 504 represents the orientation of the tool and the angle of formation property object 506 represents the relative dip angle of nearest bed boundary (i.e., angle 80 discussed for FIG. 3). It should be understood that the relative dip angle may vary for different bed boundaries and for different TVDs. In FIG. 5G, there are approximately 40 TVD blocks and 40 bed boundary shapes (one for each TVD block). However, it should be noted that not every TVD will have an associated bed boundary shapes (if there are no bed boundaries within the range of the tool at a given TVD). Further, some TVDs may be associated with multiple bed boundaries shapes (if there are multiple bed boundaries within the range of the tool at a given TVD).

In some embodiments, the 3D map view option of FIG. 5G includes a plurality of interactive points along the drill path that display, upon selection, additional information such as a distance to a nearest bed boundary, a relative dip angle to the nearest bed boundary, an azimuth angle for the nearest bed boundary, and/or other information. FIG. 5H shows a rotated 3D map view option related to the 3D map view option of FIG. 5G. The rotated 3D map views as illustrated in FIG. 5H may facilitate viewing plotted data. Further, FIG. 5H shows formation details (bed dip=20°, and bed azimuth=45°) for one of the interactive points along the drill path. As an example, the formation details may be displayed when a user selects a particular interactive point or passes over the interactive point with a cursor.

FIGS. 5I-5J shows 2D map view options related to the 3D map view option of FIG. 5G. More specifically, FIG. 5I shows the drill path and bed boundaries plotted as a function of TVD and east/west horizontal coordinates, FIG. Si shows the drill path and bed boundaries plotted as a function of TVD and north/south horizontal coordinates, and FIG. 5K shows bed boundaries objects plotted as a function of east/west horizontal coordinates and north/south horizontal coordinates. As in FIG. 5G, different colors or patterns may be used in FIGS. 5I-5J to identify different formation resistivity values for the bed boundaries. Also, the 2D map view options of FIGS. 5I-5J may include interactive points along the drill path that display formation parameters, upon selection, as described herein. The 2D/3D map view options of FIGS. 5G-5J may use different patterns, different pattern densities, and/or different pattern scaling to shows resistivity values as described herein.

As shown, FIGS. 5G-5J illustrate 2D or 3D map views that display a drill path (e.g., path 502 in FIG. 5G) with drill path objects (e.g., object 504) and bed boundary objects (e.g., object 506 in FIG. 5G) corresponding to various depth values along the drill path. In some embodiments, each displayed bed boundary object marks part of a bed boundary. Further, each displayed bed boundary object may convey formation property information such as resistivity or electromagnetic permeability. Meanwhile, each displayed drill path object is located on or near the drill path and may convey tool orientation and/or formation property information along the drill path. For example, each bed boundary object or drill path object of FIGS. 5G-5J may have a color or pattern attribute to indicate a formation resistivity or electromagnetic permeability value. Further, each bed boundary object may have a dip angle attribute to indicate a relative dip angle value for a bed boundary with respect to a reference point for the tool. Also, each bed boundary object may have an azimuth angle attribute to indicate a relative azimuth for a bed boundary with respect to a reference point for the tool. Similarly, each drill path object may have a dip angle attribute to indicate a relative dip angle value for the tool with respect to a reference point, and may have an azimuth angle attribute to indicate an azimuth angle value for the tool with respect to a reference point.

It should also be understood that the map views of FIGS. 5G-5J are rotatable in at least one direction. Further, the map views of FIGS. 5G-5J may support zoom in and zoom out features. Further, the map views of FIGS. 5G-5J may support selecting a bed boundary object or drill path object to display supplemental data related to the bed boundary object or drill path object. For example, the supplemental drill path object data may include a numeric value for a tool dip angle relative to a reference point, a numeric value for a tool azimuth relative to a reference point, and a numeric value for formation resistivity or electromagnetic permeability at or near a selected drill path object. Meanwhile, supplemental bed boundary object data may include a numeric value for a relative dip angle of a bed boundary, a numeric value for an azimuth angle between a tool orientation and a bed boundary, and a numeric value for formation resistivity or electromagnetic permeability at or near a bed boundary object. FIGS. 5L-5R show 2D map view options that plot distance to bed boundary lines as a function of vertical depth. The length of the distance to bed boundary lines corresponds to a scaled physical distance. Meanwhile, the angle of the distance to bed boundary lines (relative to the center line in FIGS. 5L-5R) corresponds to a relative dip to the bed boundary at the vertical depth associated with each distance to bed boundary lines. It should be noted that the angle for the distance to bed boundary lines can be measured with respect to horizontal or vertical axis.

In FIG. 5L, arrows are employed as the distance lines. Further, FIG. 5L shows, for several distance lines, formation details including relative dip to the nearest bed boundary ($\theta$), azimuth for the nearest bed boundary ($\phi$), and distance to the nearest bed boundary (d). In FIG. 5M, an azimuth indicator (e.g., a circle with a line representing a degree) is shown at the end of each distance line to show azimuth information for the nearest bed boundary. More specifically, the azimuth information is drawn as a line inside a circle, where the orientation of the line inside the circle represents the azimuth of the nearest bed boundary. In FIG. 5N, an azimuth indicator for each distance line is shown along one side to show azimuth information for a bed boundary relative to a tool orientation. Here it should be noted that direction or distance to a bed boundary are defined with respect to a selected point of the bed boundary to a predetermined reference point of the tool. For example, the selected point of the bed boundary can be the point with the shortest distance to the predetermined reference point of the tool. The depth of each azimuth indicator in FIG. 5N corresponds to the depth of its associated distance line. In FIG. 5O, the distance lines are dashed and the azimuth indicators are simplified to be a line at the end of each distance line. In FIG. 5P, strips are used to represent distance lines. In FIGS. 5L-5P, the top three lines or strips have a higher transparency to convey a higher degree of uncertainty with respect to their values. In alternative embodiments, color variations or shades (e.g., a lighter shade represents more uncertainty) may be used instead of transparency to represent different levels of uncertainty.

FIG. 5Q shows two sets of distance lines. The first set of distance lines (dashed line arrows) is associated with a first inversion algorithm, and the second set of distance lines (solid line arrows) is associated with a second inversion algorithm. As shown, the two sets of distance lines vary slightly. As an example, the different inversions may correspond to two sets of logging data for the same region collected at different frequencies. Some LWD operators may favor the distance tines associated with the first inversion algorithm, while others favor the distance lines associated with the second inversion algorithm. Further, some operators may want to review the difference between the distance lines associated with two or more inversion algorithms.

FIG. 5R shows distance lines with an area of uncertainty at the end of each distance line. In some embodiments, the area of uncertainty is estimated using a noise injection operation that injects noise into a measurement plotting process and analyses the density of the result. In alternative embodiments, a quality of inversion ($Q_f$) estimate may be displayed for each distance line.

As shown, FIGS. 5L-5R illustrate 2D map views that display a separate distance to bed boundary indicator (e.g., distance lines) for each of a plurality of distinct depth values. The map views of FIGS. 5L-5R also may display a center line to represent a reference point for the tool as a function of depth. In some embodiments, each distance to bed boundary indicator corresponds to an arrow extending between the center line and a bed boundary. In alternative embodiments, each distance to bed boundary indicator corresponds to a strip extending at least between the center line and a nearest bed boundary. It should be understood that each arrow or strip may have a color or pattern to provide formation resistivity or electromagnetic permeability information.

The map views of FIGS. 5L-5R may display an azimuth indicator for at least one of the distance to bed boundary indicators to represent an angle between a bed boundary azimuth and a tool reference point azimuth. For example, the azimuth indicator may be displayed at or near a bed boundary related to a distance to nearest bed boundary indicator (e.g., at or near an arrow tip that ends at the bed boundary). In alternative embodiments, the azimuth indicator may be displayed along a side of the map view at a depth corresponding to a related distance to bed boundary indicator. The azimuth indicator may be a radial line inside a circular shape to represent the angle between a bed boundary azimuth and a tool reference point azimuth.

Further, the map views of FIGS. 5L-5R may display a bed boundary line for one or more distance to bed boundary indicators, where an angle of bed boundary line corresponds to a relative dip angle value with respect to a reference point for the tool. Further, in some embodiments, at least one of the displayed distance to bed boundary indicators is partially transparent to show a level of uncertainty as described herein.

In at least some embodiments, the map views of FIGS. 5L-5R are interactive and support selecting a distance to nearest bed boundary indicator to display supplemental data related to the distance to bed boundary indicator. As an example, the supplemental data may include a numeric value of a relative dip angle value between a tool orientation and the related bed boundary, a numeric value of relative azimuth angle value between a tool orientation and the related bed boundary, and/or a numeric value of a distance between a reference point for the tool and the related bed boundary.

Further, the map views of FIGS. 5L-5R may display an area of uncertainty for at least one distance to bed boundary indicator, where the area of uncertainty corresponds to a range of possible values for the related distance to bed boundary indicator. For example, the area of uncertainty may be an enclosed shape (e.g., a circle), where a related distance to bed boundary indicator points to a center of the shape.

In at least some embodiments, a map view (e.g., the map view of FIG. 5Q) displays two sets of distance to bed boundary indicators corresponding to two different data sets collected by the tool. The different data sets may correspond to logging data sets captured using two different frequencies for a logging tool, or to logging data sets captured using two different types of logging tools.

Further, it should be understood that if multiple bed boundaries are within the measurement range of the tool, then map views such as those shown in FIGS. 5L-5R may display multiple distance to bed boundary indicators extending from the same depth value. For example, multiple arrows are strips may extend from a single depth value to different bed boundaries. In such case, different arrow colors and/or patterns may be utilized to ensure different distance to bed boundary indicators are distinguishable. Further, it should be understood that even if multiple bed boundaries are within the measurement range of the tool, map views such as those shown in FIGS. 5L-5R may only show distance to bed boundary indicators for the nearest bed boundaries.

FIG. 5S shows a radar map view option that plots look-ahead or look-around distance to a nearest bed boundary as a function of azimuth. In FIG. 5S, the bit is displayed at the center of the radar map, and concentric circles are used to represent distance. In FIG. 5S, resistivity colors/patterns, formation details, and algorithm information may be displayed as described herein.

As shown, FIG. 5S illustrates a radar map view that displays a tool reference point and concentric circles around the tool reference point to represent distance from the tool reference point. In FIG. 5S, the radar map view displays formation properties as a function of azimuth with respect to an axis for the tool.

In at least some embodiments, the radar map view of FIG. 5S may display an azimuth indicator relative to an azimuth reference point for the tool. In other words, the map view may display a cross-section view along the tool axis, where the cross-section angle is relative to an azimuth reference point for the tool. It should be understood that many different cross-section views are possible along the tool axis (i.e., there is a range of 360 degrees), and thus different map views are possible. Regardless of the particular azimuth, a radar map view may display a tool object extending from the tool reference point (at the center) to a top of the radar map view. In alternative embodiments, a radar map view may display a tool object extending from the tool reference point to a side of the radar map view along an angle related to an orientation of the tool. In such case, the cross-section view along the tool axis, which is represented by the radar map view, would be adjusted accordingly.

Further, the radar map view may be interactive and supports selecting a displayed formation property to display supplemental data. For example, the supplemental data includes a numeric value of a relative dip angle value between a tool orientation and a bed boundary, a numeric value of relative azimuth angle value between a tool orientation and a bed boundary, and/or a numeric value of a distance between the tool reference point and a bed boundary. Further, in some embodiments, a radar map view displays an inversion algorithm indicator for each displayed formation layer. Such inversion algorithm indicators may provide information regarding the particular logging tool, frequency, and/or inversion technique related to the displayed formation layers.

FIGS. 5T and 5U show wrapping map view options that plot a well path as a function of true vertical depth (TVD), and that wrap well path data or other data when map boundaries are exceeded. Here wrapping means making a mapping of coordinates such that the position of the shape will always be inside the drawing canvas. One particular type of wrapping moves the lines that exit the canvas from the right-hand side, to the left-hand side, and vice-versa. In FIG. 5T, distance lines (distance to nearest bed boundary indicators) extend from the well path and may be used to ascertain a bed boundary. Meanwhile, in FIG. 5U, bed boundary lines and vertical depth information are displayed.

As shown, FIGS. 5T and 5U illustrates wrapping map views that display a drill path and bed boundaries as a function of depth and horizontal position, where the map view wraps the horizontal position of the displayed drill path to an opposite side of the map view when a horizontal length of the drill path exceeds a horizontal position range of the map view. In some embodiments, a wrapping map view may display distance to nearest bed boundary indicators for each of a plurality of distinct depth values. Further, a wrapping map view may display a separate bed boundary line for each of the distance to nearest bed boundary indicators. Further, a wrapping map view may display a relative dip angle indicator for at least one of the distance to nearest bed boundary indicators.

In some embodiments, a wrapping map view may display a continuous line for each bed boundary. In such case, distance to nearest bed boundary indicators may be omitted. Further, some wrapping map view may display a vertical depth value for each bed boundary.

Figure 6:
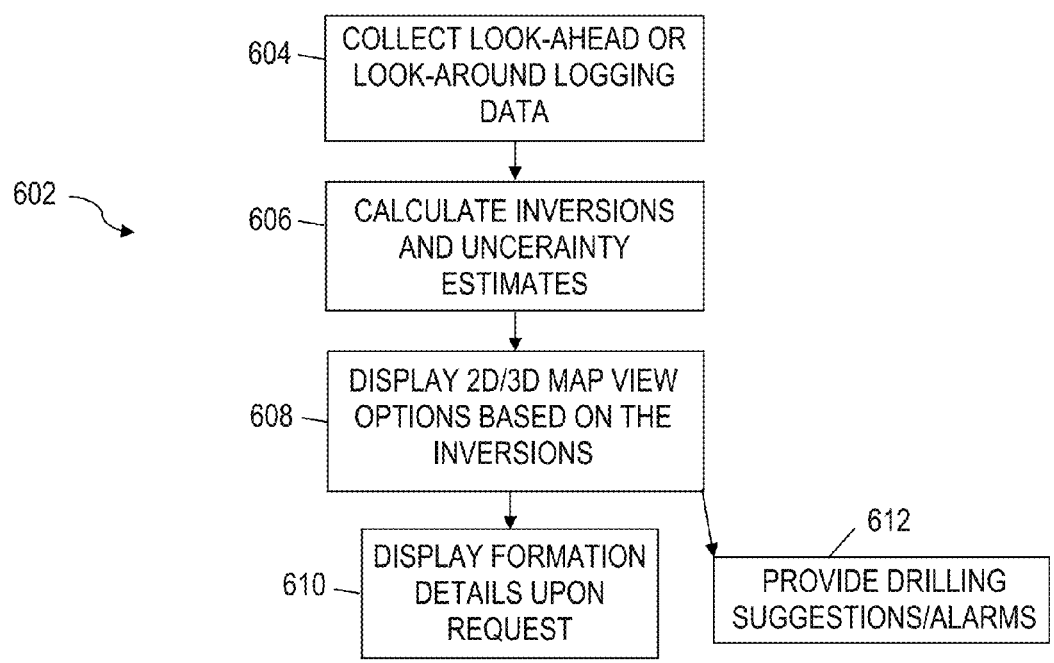
FIG. 6 is a flowchart of an illustrative method for a LWD visualization system.

FIG. 6 is a flowchart of an illustrative method 602 for an LWD system. As shown, the method 602 includes collecting look-ahead or look-around logging data (block 604). At block 606, inversions and uncertainty estimates are calculated. At block 608, 2D or 3D map view options are displayed based on the inversions. The map view options displayed at block 608 may correspond to any of the map view examples described in FIGS. 5A-5U, combinations thereof, or variations thereof. In some embodiments, different map views may be displayed at the same time.

Upon request, formation details are displayed at block 610. The formation details may refer to alphanumeric characters and values that appear upon selection of a line, shape, or interactive point in a displayed map view. At block 612, drilling suggestions or alarms are provided. The drilling suggestions may correspond to lines or arrows in a map view to show a suggested drilling direction. Meanwhile, an alarm may correspond to audio or visual indicator, and related values that triggered the alarm (e.g., being closer to a nearest bed boundary than a predetermined threshold). A drilling suggestion may or may not accompany an alarm. In some embodiments, the method 602 is performed by a computer executing steering visualization software as described herein. With the information provided by the method 602, an LWD operator is able to select appropriate steering commands for a LWD tool.

In some embodiments, displaying a map view option at block 608 includes displaying a 2D map view showing formation properties in a single predetermined direction with respect to a reference point for the tool as a function of depth. Additionally or alternatively, displaying a map view option at block 608 includes displaying a 2D or 3D map view showing a drill path and at least one separate 2D or 3D drill path object for each of a plurality of distinct depth values along the drill path. Additionally or alternatively, displaying a map view option at block 608 includes displaying a 2D map view showing a separate distance to bed boundary indicator for each of a plurality of distinct depth values. Additionally or alternatively, displaying a map view option at block 608 includes displaying a radar map view showing a tool reference point and concentric circles around the tool reference point to represent distance from the tool reference point, where the radar map view displays formation property objects as a function of azimuth with respect to an axis for the tool. The formation property objects may be boundary lines and/or formation information such as resistivity or electromagnetic permeability. Additionally or alternatively, displaying a map view option at block 608 includes displaying a map view showing a drill path and bed boundaries as a function of depth and horizontal position, where the map view wraps the horizontal position of the displayed drill path to an opposite side of the map view when a horizontal length of the drill path exceeds a horizontal position range of the map view.

In different map views, different features may be enables or disabled. For example, map views may employ a resistivity scaling feature that scales a pattern to represent anisotropic formation property values. Further, map views may employ different colors or patterns to identify different formation resistivity or permeability values. Further, map views may employ interactive drill path objects and/or bed boundary objects, where selecting (e.g., by clicking or moving a cursor over an object) an object causes supplemental data to be displayed as described herein. Additionally or alternatively, displaying a map view option at block 608 includes showing uncertainty features that use transparency, areas of uncertainty, or different inversion data plots to show a level of uncertainty for plotted data.

It is to be understood that the various embodiments of the present disclosure described above may be utilized with various types of ahead of bit or around bit measurements without departing from the principles of this disclosure. Further, the illustrated map view options are merely examples of useful map view embodied by the principles of the disclosure, which is not limited to any specific details of these embodiments. Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of the present disclosure.

What is claimed is:

1. A method comprising:
acquiring ahead of bit or around bit data related to a formation from measurements by a tool;
generating a two-dimensional (2D) map view of the formation using the acquired data, wherein the 2D map view displays a distance to formation properties in a single predetermined direction with respect to a reference point for the tool along a first axis as a function of depth along a second axis, wherein the first axis defines a sensing range of the tool; and
steering a logging tool in the formation based on the 2D map view.

2. The method of claim 1, wherein the predetermined direction corresponds to an ahead of bit direction relative to the reference point.

3. The method of claim 1, wherein the predetermined direction corresponds to a sideways of bit direction relative to the reference point.

4. The method of claim 1, wherein the map view includes a sloped line along a depth axis to represent a bed boundary between two formation layers displayed for a depth value, and wherein an angle of the sloped line corresponds to a relative dip angle indicator between the predetermined direction and said bed boundary.

5. The method of claim 1, wherein the map view includes a straight line along a depth axis to represent a bed boundary between two formation layers displayed for a depth value, and wherein a relative dip angle indicator separate from the straight line is displayed for the depth value to represent an angle between the predetermined direction and said bed boundary.

6. The method of claim 5, wherein the relative dip angle indicator is an arrow whose tail is at or near the reference point for the tool along the second axis, and wherein an angle of the arrow with respect to the reference point conveys relative dip angle information.

7. The method of claim 1, wherein the map view displays formation resistivity or electromagnetic permeability.

8. The method of claim 1, wherein the map view includes a distinct relative dip angle indicator for each depth value with a displayed bed boundary.

9. The method of claim 1, wherein the map view displays a formation property using color, wherein different colors represent different formation property values.

10. The method of claim 1, wherein the map view displays a formation property using a pattern, wherein different pattern densities represent different formation property values.

11. The method of claim 10, wherein the pattern is scaled in at least one direction relative to a default pattern to represent anisotropic values.

12. A non-transitory computer-readable storage device having instructions stored thereon, which, when executed by one or more processors of a computer, cause the computer to perform operations, the operations comprising the method of claim 1.

13. The non-transitory computer-readable storage device of claim 12, wherein the instructions, when executed by one or more processors of the computer, cause the computer to switch between different map views in response to a user request.

14. The non-transitory computer-readable storage device of claim 12, wherein the instructions, when executed by one or more processors of the computer, cause the computer to display multiple map views in response to a user request.

15. The non-transitory computer-readable storage device of claim 12, wherein the instructions, when executed by one or more processors of the computer, cause the computer to enable or disable different map view features in response to a user request.

16. A system comprising:
one or more processors;
a user interface operable with the one or more processors; and
a computer-readable storage device that stores a steering visualization software tool that when executed by the one or more processors, causes the system to perform operations, the operations comprising the method of claim 1.

17. The system of claim 16, wherein the system includes the tool to acquire ahead of bit or around bit data.

18. The system of claim 16, wherein the system includes an input device operable with the user interface, wherein the input device provides user inputs for the steering visualization software tool to switch between different map views, to display multiple map views, to enable different map view features, or to disable different map view features.

19. The method of claim 1, wherein the reference point is at a drill bit; and the single predetermined direction is ahead or behind the drill bit.

20. A method comprising:
acquiring ahead of bit or around bit data related to a formation from measurements by a tool;
generating a two-dimensional (2D) or three-dimensional (3D) map view of the formation using the acquired data, wherein the 2D or 3D map view displays a drill path and a separate graphically selectable 2D or 3D drill path object for each of a plurality of distinct depth values along the drill path based on a user interaction with the displayed 2D or 3D drill path object; and
steering a logging tool in the formation based on the 2D or 3D map view.

21. The method of claim 20, wherein at least one of the displayed drill path objects includes a color or pattern attribute to convey formation resistivity or electromagnetic permeability information.

22. The method of claim 20, wherein at least one of the displayed drill path objects includes an orientation attribute corresponding to a tool orientation.

23. The method of claim 20, wherein the map view enables graphical selection of a displayed drill path object via the user interaction with the displayed drill path object which causes supplemental drill path object data to be overlaid on the map view.

24. The method of claim 23, wherein the supplemental drill path object data includes at least one value selected from the group consisting of a numeric value for a tool dip angle relative to a reference point, a numeric value for a tool azimuth relative to a reference point, and a numeric value for formation resistivity or electromagnetic permeability at or near a selected drill path object.

25. The method of claim 20, wherein the map view displays at least one 2D or 3D bed boundary object for each of a plurality distinct depth values along the drill path.

26. The method of claim 25, wherein at least one of the displayed bed boundary objects includes a color or pattern attribute to convey formation resistivity or electromagnetic permeability information.

27. The method of claim 25, wherein at least one of the displayed bed boundary objects includes an orientation attribute corresponding to a relative dip angle for a bed boundary with respect to a reference point for the tool.

28. The method of claim 25, wherein the map view enables selection of a displayed bed boundary object to display supplemental bed boundary object data.

29. The method of claim 28, wherein the supplemental bed boundary object data includes at least one value selected from the group consisting of a numeric value for a relative dip angle of a bed boundary, a numeric value for an azimuth angle between a tool orientation and a bed boundary, and a numeric value for formation resistivity or electromagnetic permeability at or near a bed boundary object.

30. The method of claim 20, wherein the map view is rotatable in at least one direction.

31. The method of claim 20, wherein the map view supports zooming in and zooming out.

32. A method comprising:
acquiring ahead of bit or around bit data related to a formation from measurements by a tool;
generating a two-dimensional (2D) map view of the formation using the acquired data, wherein the 2D map view displays a separate distance with respect to a reference point for the tool to bed boundary indicator for each of a plurality of distinct depth values, wherein the reference point is at a center of the 2D map view and divides the 2D map view into a first half and a second half; wherein the first half is indicative of data related to the formation behind the bit and the second half is indicative of data related to the formation ahead of the bit and wherein an axis of the 2D map defining a sensing range of the tool indicates a distance to the data related to the formation relative to the reference point; and
steering a logging tool in the formation based on the 2D map view.

33. The method of claim 32, wherein the map view displays a center line centered in the 2D map view to represent the current position of the reference point for the tool in the formation as a function of depth.

34. The method of claim 33, wherein each distance to bed boundary indicator corresponds to an arrow extending between the center line and a nearest bed boundary.

35. The method of claim 33, wherein each distance to bed boundary indicator corresponds to a strip extending at least between the center line and a bed boundary.

36. The method of claim 35, wherein each strip has a color or pattern to provide formation resistivity or electromagnetic permeability information.

37. The method of claim 32, wherein the map view displays an azimuth indicator for at least one of the distance to bed boundary indicators to represent an angle between a bed boundary azimuth and a tool reference point azimuth.

38. The method of claim 37, wherein the azimuth indicator is displayed at or near a bed boundary related to a distance to bed boundary indicator.

39. The method of claim 37, wherein the azimuth indicator is displayed along a side of the map view at a depth corresponding to a related distance to bed boundary indicator.

40. The method of claim 37, wherein the azimuth indicator is a radial line inside a circular shape to represent the angle between a bed boundary azimuth and a tool reference point azimuth; and wherein the azimuth indicator is located at an end of a respective bed boundary indicator.

41. The method of claim 32, wherein the map view displays a bed boundary line for at least one of the distance to bed boundary indicators, wherein an angle of the bed boundary line corresponds to a relative dip angle value with respect to a reference point for the tool.

42. The method of claim 32, wherein at least one of the displayed distance to bed boundary indicators is partially transparent at a first transparency level to show a first level of uncertainty of distance to bed boundary and others of the at least one of the displayed distance to bed boundary indicators are partially transparent at a second transparency to show a second level of uncertainty of distance to bed boundary.

43. The method of claim 32, wherein the map view supports selecting a distance to bed boundary indicator to display supplemental data related to the distance to bed boundary indicator.

44. The method of claim 43, wherein the supplemental data includes at least one value selected from the group consisting of a numeric value of a relative dip angle between a tool orientation and the bed boundary, a numeric value of relative azimuth angle between a tool orientation and the bed boundary, and a numeric value of a distance between a reference point for the tool and the bed boundary.

45. The method of claim 32, wherein the map view displays an area of uncertainty for at least one of the distance to bed boundary indicators, wherein the area of uncertainty corresponds to a range of possible distance and direction values for the related distance to bed boundary indicator.

46. The method of claim 45, wherein the area of uncertainty is a shape, and wherein the related distance to bed boundary indicator points to a center of the shape.

47. The method of claim 32, wherein the map view displays two sets of distance to bed boundary indicators corresponding to two different data sets collected by the tool.

48. The method of claim 32, wherein the map view displays multiple distance to bed boundary indicators for a single depth value, wherein each of said multiple distance to bed boundary indicators is associated with a different bed boundary.

49. The method of claim 32, wherein the map view only displays distance to nearest bed boundary indicators.

50. The method of claim 32, wherein the reference point is at a drill bit.

51. A method comprising:
acquiring ahead of bit or around bit data related to a formation from measurements by a tool;
generating a radar map view of the formation using the acquired data, wherein the radar map view displays a tool reference point at a center of the radar map view indicative of a current position of the tool reference point in the formation and concentric circles around the center of the radar map view represent look around and look ahead distance relative to the current position of the tool reference point based on a sensing range of the tool, and wherein the radar map view displays formation property objects as a function of azimuth with respect to an axis associated with the current position of the tool, wherein the formation property objects are graphically selectable based on a user interaction; and
steering a logging tool in the formation based on the radar map view.

52. The method of claim 51, wherein the radar map view displays an azimuth indicator relative to an azimuth reference point for the tool.

53. The method of claim 51, wherein the radar map view displays a tool object extending from the tool reference point to a top of the radar map view.

54. The method of claim 51, wherein the radar map view displays a tool object extending from the tool reference point to a side of the radar map view along an angle related to an orientation of the tool.

55. The method of claim 51, wherein the radar map view supports selecting a displayed formation property object to display supplemental data.

56. The method of claim 55, wherein the supplemental data includes a value selected from the group consisting of a numeric value of a relative dip angle between a tool orientation and a bed boundary, a numeric value of relative azimuth angle between a tool orientation and a bed boundary, a numeric value of a distance between a tool reference point and a bed boundary, and a numeric value for formation resistivity or electromagnetic permeability at or near a selected formation property object.

57. The method of claim 51, wherein the radar map view displays an inversion algorithm indicator for at least one of the displayed formation property objects.

58. The method of claim 51, wherein the radar map view displays a color or pattern to represent a resistivity or electromagnetic permeability for at least one of the displayed formation property objects.

59. The method of claim 51, wherein the tool reference point is at a drill bit.

60. A method comprising:
acquiring ahead of bit or around bit data related to a formation from measurements by a tool;
generating a map view of the formation using the acquired data, wherein the map view displays a drill path and bed boundaries as a function of depth and horizontal position, wherein the drill path is defined by a first line segment and second line segment; wherein the first line segment is indicative of the drill path over a horizontal position range of the map view; and the second line segment is indicative of the drill path outside the horizontal position range of the map view; wherein the map view initially displays the first line segment while a horizontal length of the drill path is less than or equal to the horizontal position range of the map view and then displays the second line segment wrapped to an opposite side of the map view below the first segment when the horizontal length of the drill path exceeds the horizontal position range of the map view; and
steering a logging tool in the formation based on the map view.

61. The method of claim 60, wherein the map view displays distance to bed boundary indicators for each of a plurality of distinct depth values.

62. The method of claim 61, wherein the map view displays a separate bed boundary line for each of the distance to bed boundary indicators.

63. The method of claim 61, wherein the map view displays a relative dip angle indicator for at least one of the distance to bed boundary indicators.

64. The method of claim 60, wherein the map view displays a continuous line for each bed boundary.

65. The method of claim 64, wherein the map view displays a numeric vertical depth value at or near each displayed bed boundary.

* * * * *